United States Patent [19]

Tenma et al.

[11] Patent Number: 4,692,876
[45] Date of Patent: Sep. 8, 1987

[54] AUTOMATIC FREIGHT STACKING SYSTEM

[75] Inventors: Tadashi Tenma, Sagamihara; Kichizo Akashi, Ebina; Yozo Konishi, Tochigi; Hideo Watase, Tsuchiura, all of Japan

[73] Assignee: Hitachi, Ltd., Tokyo, Japan

[21] Appl. No.: 787,455

[22] Filed: Oct. 15, 1985

[30] Foreign Application Priority Data

Oct. 12, 1984 [JP] Japan .................................. 59-212517
Dec. 26, 1984 [JP] Japan .................................. 59-272917

[51] Int. Cl.$^4$ .............................................. G06F 15/20
[52] U.S. Cl. .................................... 364/513; 364/478; 901/7; 414/103; 414/110; 414/900
[58] Field of Search ................ 364/478, 513; 318/568; 901/7, 9; 414/72, 74, 103, 110, 900

[56] References Cited

U.S. PATENT DOCUMENTS

| | | | |
|---|---|---|---|
| 4,287,459 | 9/1981 | Dahlstrom | 364/478 |
| 4,549,272 | 10/1985 | Hagan | 364/478 |
| 4,566,595 | 1/1986 | Fustier | 364/478 |
| 4,613,269 | 9/1986 | Wilder | 364/478 |

Primary Examiner—Jerry Smith
Assistant Examiner—Allen MacDonald
Attorney, Agent, or Firm—Antonelli, Terry & Wands

[57] ABSTRACT

An automatic freight stacking system for loading previously determined freight articles of various configurations (shapes, size, material, etc.) to be shipped, using a loading scheduler for determining a loading schedule on the basis of the existing various configurations of the freight articles, marshalling equipment for receiving the freight articles in a given order and delivering them in a predetermined order which is determined by the scheduler, a feeding conveyor for carrying the delivered freight articles and transporting means to the places of the respective loading means allocated by the loading scheduler, and the loading means for loading the carried freight articles on the transporting means in accordance with the scheduled operation sequence. In the case where the configurations of certain freight articles to be shipped are unknown before the arrival thereof, a reader is provided to read the dimensions of the freight articles upon arrival thereof and then the operator monitors through a display terminal the state of the articles and the state of the articles loaded on the transporting means and indicates the freight article to be loaded as well as the position to be loaded to the loading means.

6 Claims, 49 Drawing Figures

FIG. 8

| PALLET CODE | EFFECTIVE LOADING SPACE ON PALLET | | | LIMITED WEIGHT |
|---|---|---|---|---|
| | LENGTH | WIDTH | HEIGHT | |
| P A | 2.250 | 1.820 | 1.700 | 1.500 |
| P B | 2.250 | 1.520 | 1.700 | 1.500 |
| P C | 1.125 | 1.820 | 1.700 | 1.500 |

FIG. 9

| FREIGHT CODE | CONFIGURATION CLASSIFYING CODE | FREIGHT SPECIFICATION ||||  LOADING DEMAND |
|---|---|---|---|---|---|---|
| | | LENGTH | WIDTH | HEIGHT | WEIGHT | |
| S01 | S | 800 | 600 | 450 | 15 | 20 |
| S02 | S | 650 | 500 | 400 | 12 | 5 |
| S03 | S | 500 | 300 | 375 | 8 | 8 |
| S04 | L | 1.050 | 1.790 | 825 | 53 | 1 |
| S05 | B | 750 | 620 | 230 | 7 | 3 |
| S06 | L | 1.180 | 1.800 | 890 | 65 | 1 |

FIG. 10

| PATTERN NAME | PALLET CODE | LOADING NUMBER | FREIGHT CODE | LOADING POSITION ||| LOADING DIRECTION | ROBOT NUMBER |
|---|---|---|---|---|---|---|---|---|
| | | | | X | Y | Z | | |
| A | PA | 1 | S06 | 0 | 0 | 0 | L | 1 |
| A | PA | 2 | S04 | 1050 | 0 | 0 | L | 1 |
| A | PA | 3 | S01 | 0 | 0 | 890 | S | 2 |
| A | PA | 4 | S01 | 600 | 0 | 890 | S | 2 |

FIG. 11

| PATTERN NAME | LOADING ORDER | ROBOT NUMBER | LOADING NUMBER | FREIGHT CODE |
|---|---|---|---|---|
| A | 1 | 1 | 1 | S06 |
| A | 2 | 1 | 2 | S04 |
| A | 3 | 2 | 7 | S01 |
| A | 4 | 2 | 8 | S01 |

FIG. 12

| PATTERN NAME | LOADING ORDER | ROBOT NUMBER | OPERATION NODE NO. | OPERATION NODE POSITION | | | SPEED | INTER-PO-LATION | INTER-OP-ERATION | TIMER |
|---|---|---|---|---|---|---|---|---|---|---|
| | | | | x | y | z | | | | |
| A | 1 | 1 | 1 | −500 | 3.520 | 825 | 0 | — | — | 10 |
| A | 1 | 1 | 2 | −500 | 0 | 925 | 10 | — | — | — |
| A | 1 | 1 | 3 | −300 | 2.520 | 1.025 | 10 | — | — | — |
| A | 1 | 1 | 4 | −100 | 2.020 | 1.025 | 10 | — | — | — |

FIG.14

| WORK ORDER | PATTERN NAME | STATE OF WORK |
|---|---|---|
| 1 | A | 1 |
| 2 | A | 0 |
| 3 | B | 0 |
| 4 | D | 0 |

FIG.15

| LOADING ORDER | ROBOT NO. | LOADING NO. | FREIGHT CODE | LOADING STATE |
|---|---|---|---|---|
| 1 | 1 | 1 | S06 | 1 |
| 2 | 1 | 2 | S04 | 0 |
| 3 | 2 | 7 | S01 | 0 |
| 4 | 2 | 8 | S01 | 0 |

FIG. 16

| LOADING ORDER | ROBOT NO. | OPERATION NODE NUMBER | OPERATION NODE POSITION | | | SPEED | INTER-PO-LATION | INTER-OPER-ATION | TIMER | OPER-ATION STATE |
|---|---|---|---|---|---|---|---|---|---|---|
| | | | x | y | z | | | | | |
| — | 1 | 1 | -500 | 3.520 | 825 | 0 | — | — | 10 | — |
| — | 1 | 2 | -500 | 0 | 925 | 10 | — | — | — | — |
| — | 1 | 3 | -300 | 2.520 | 1.025 | 10 | — | — | — | — |
| — | 1 | 4 | -100 | 2.020 | 1.025 | 10 | — | — | — | — |

FIG. 17

| SHELF NO. | FREIGHT CODE | STOCK STATE |
|---|---|---|
| T01 | S02 | 0 |
| T02 | S01 | 1 |
| T03 | S01 | 0 |
| T04 | S03 | 0 |

FIG. 18

| FEEDING ORDER | FREIGHT CODE | SUPPLY STATE | | |
|---|---|---|---|---|
| | | ROBOT NO.1 | ROBOT NO.2 | ROBOT NO.3 |
| 1 | S06 | 1 | 0 | 0 |
| 2 | S04 | 9 | 0 | 0 |
| 3 | S01 | 0 | 9 | 0 |
| 4 | S01 | 0 | 1 | 0 |

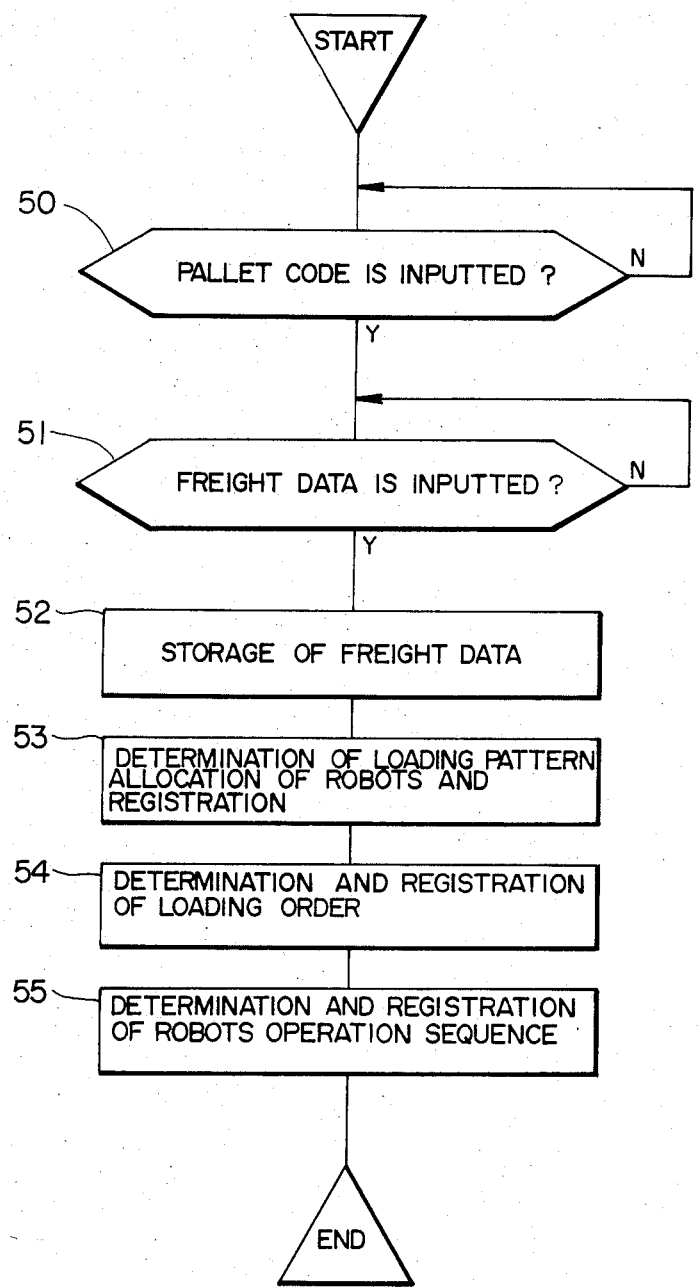

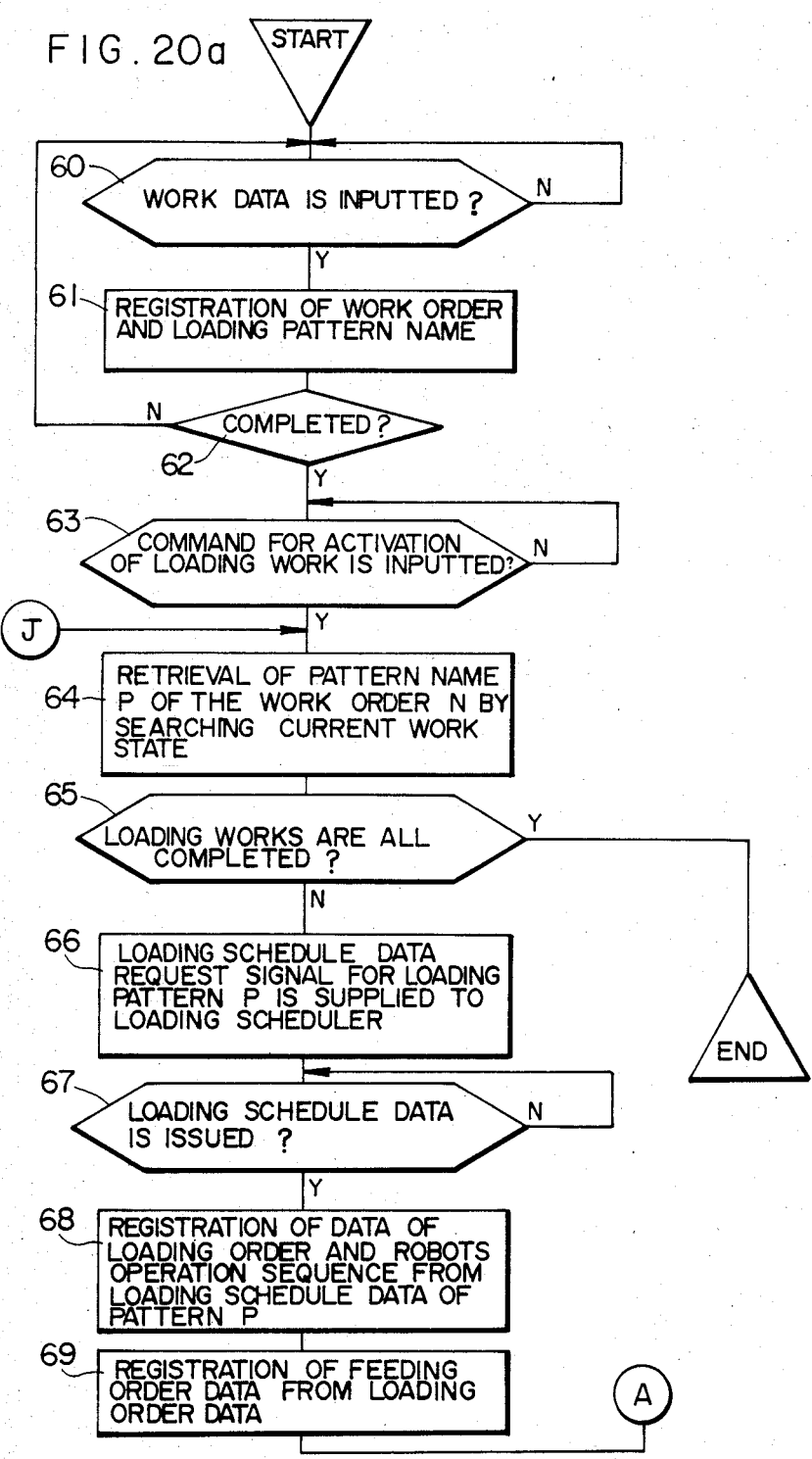

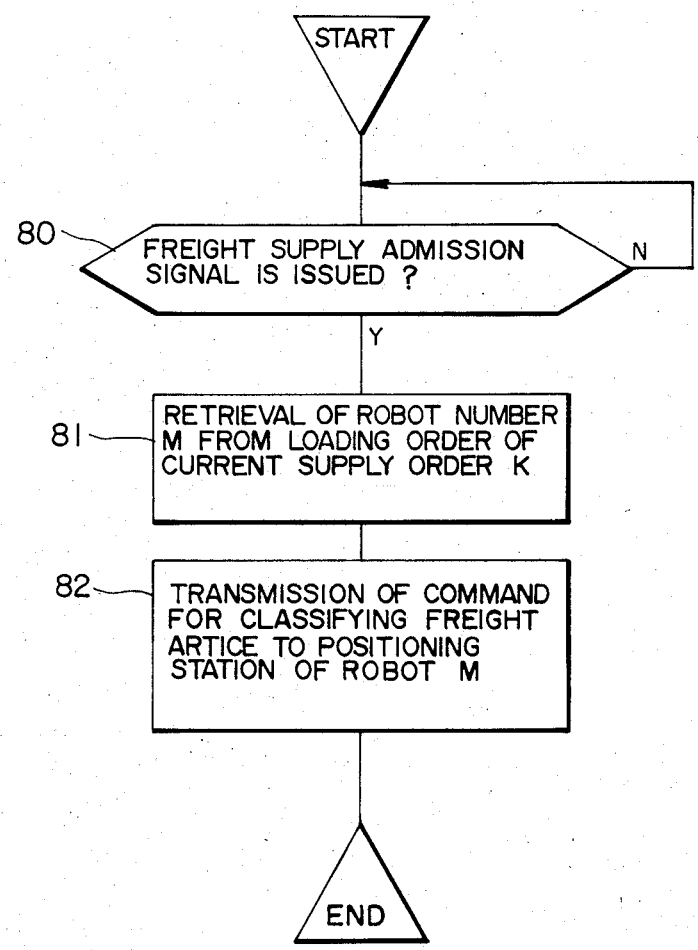

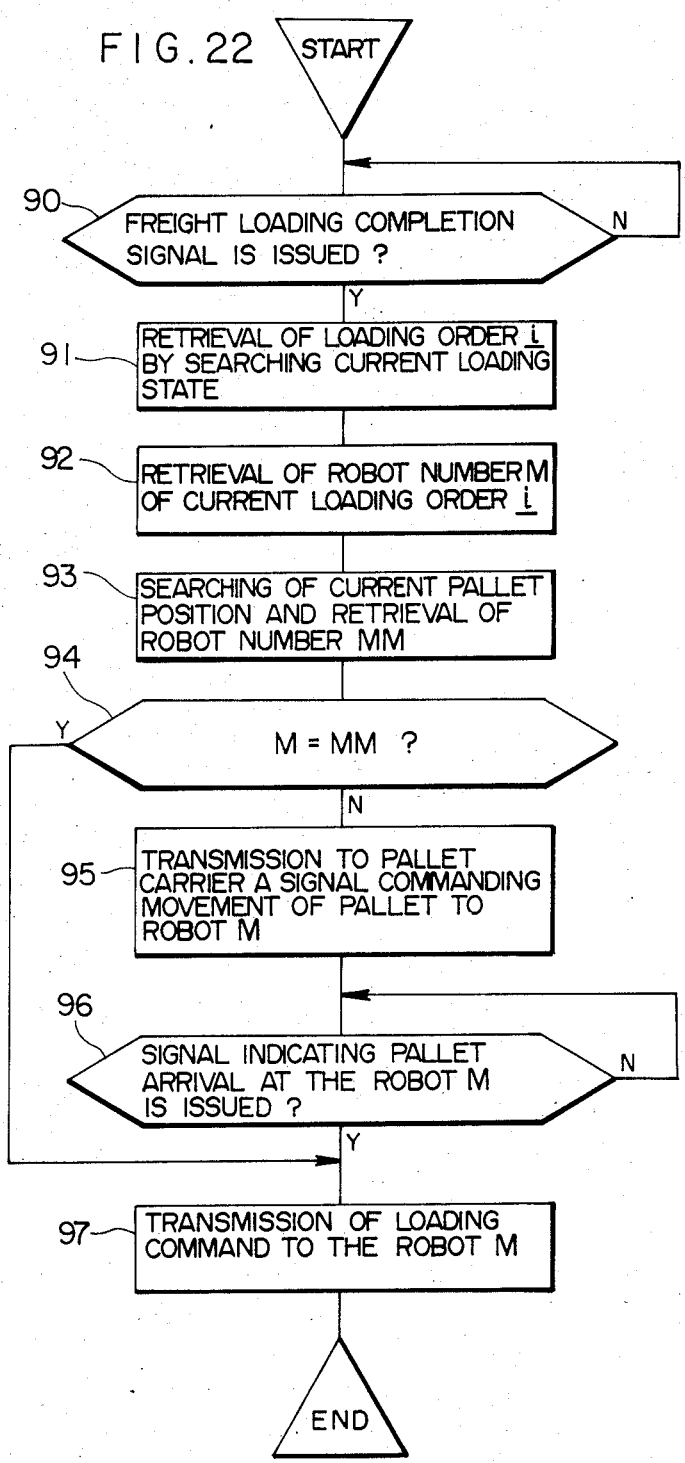

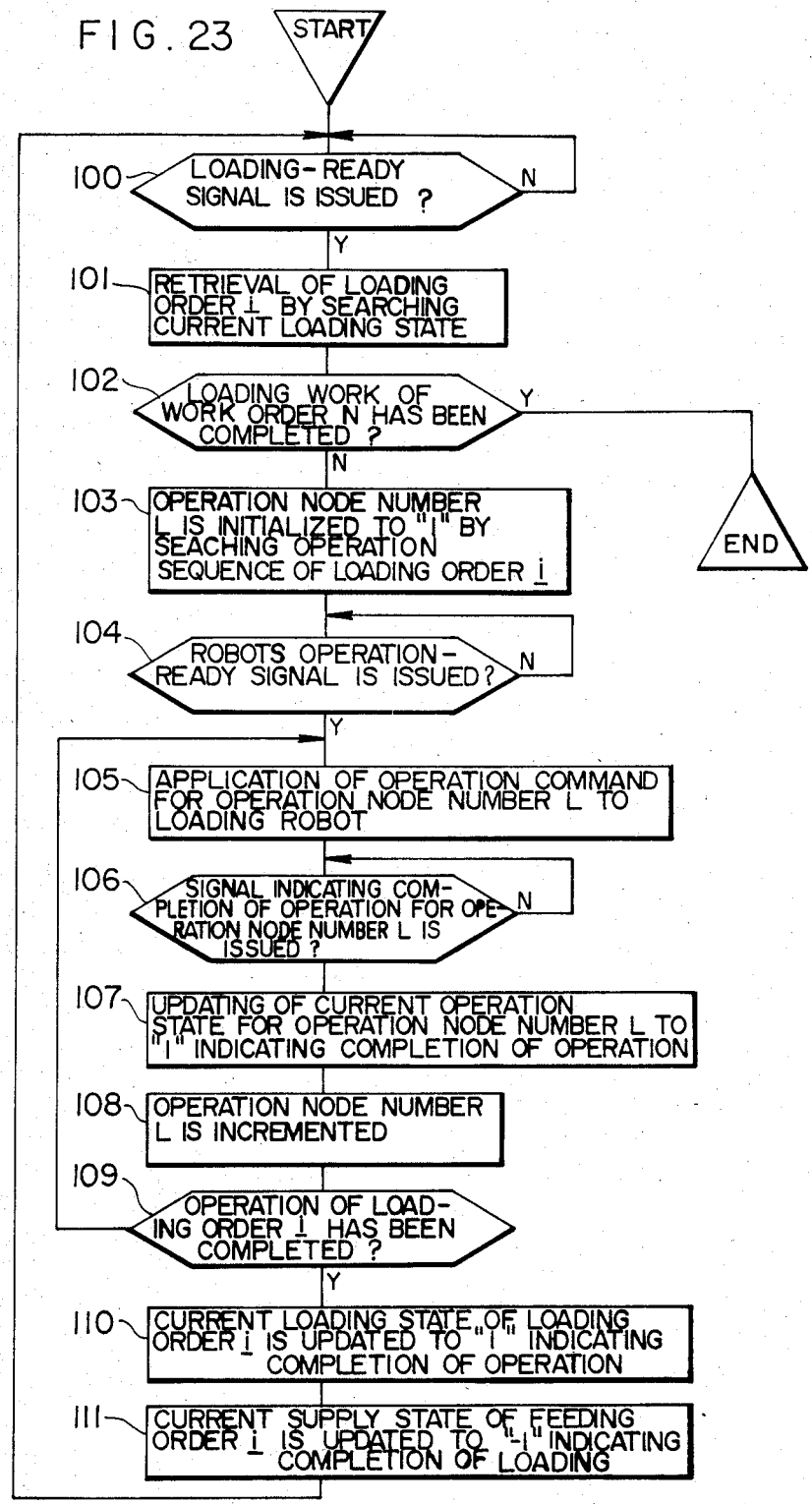

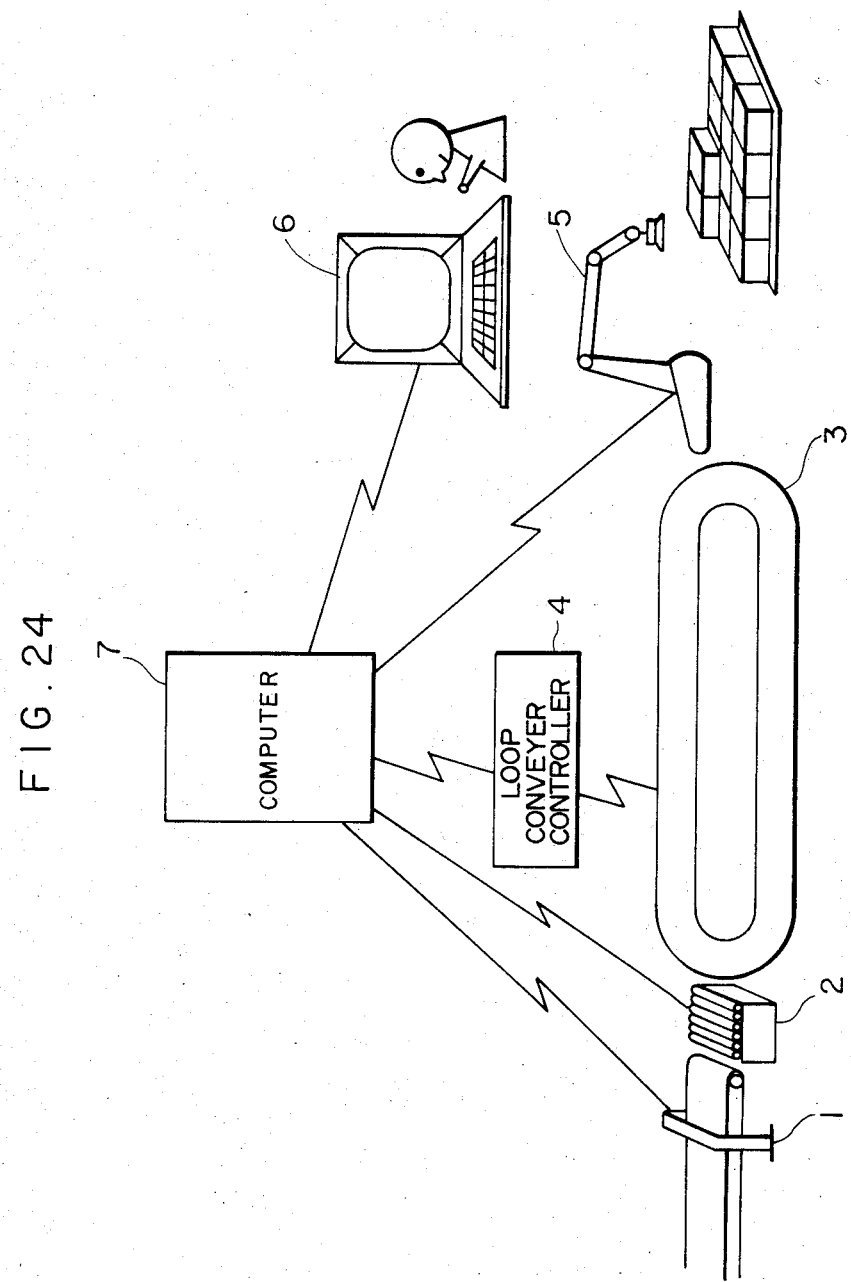

FIG. 26

| FREIGHT NAME | DIMENSION | | |
|---|---|---|---|
| | LENGTH | WIDTH | HEIGHT |
| FREIGHT NO. 1 | 1000 | 500 | 300 |
| FREIGHT NO. 2 | 600 | 400 | 400 |
| | | | |

FIG. 27

| LOOP CONVEYER ADDRESS | LOADING FREIGHT NAME |
|---|---|
| 1 | FREIGHT NO. 1 |
| 2 | BLANK |
| 3 | FREIGHT NO. 2 |
| 4 | BLANK |
| ⋮ | ⋮ |

FIG. 28

| WORK NAME | ARTICLE LOCATION |
|---|---|
| LOAD | 5 |
| UNLOAD | 3 |
| UNLOAD | 1 |
| | |

281

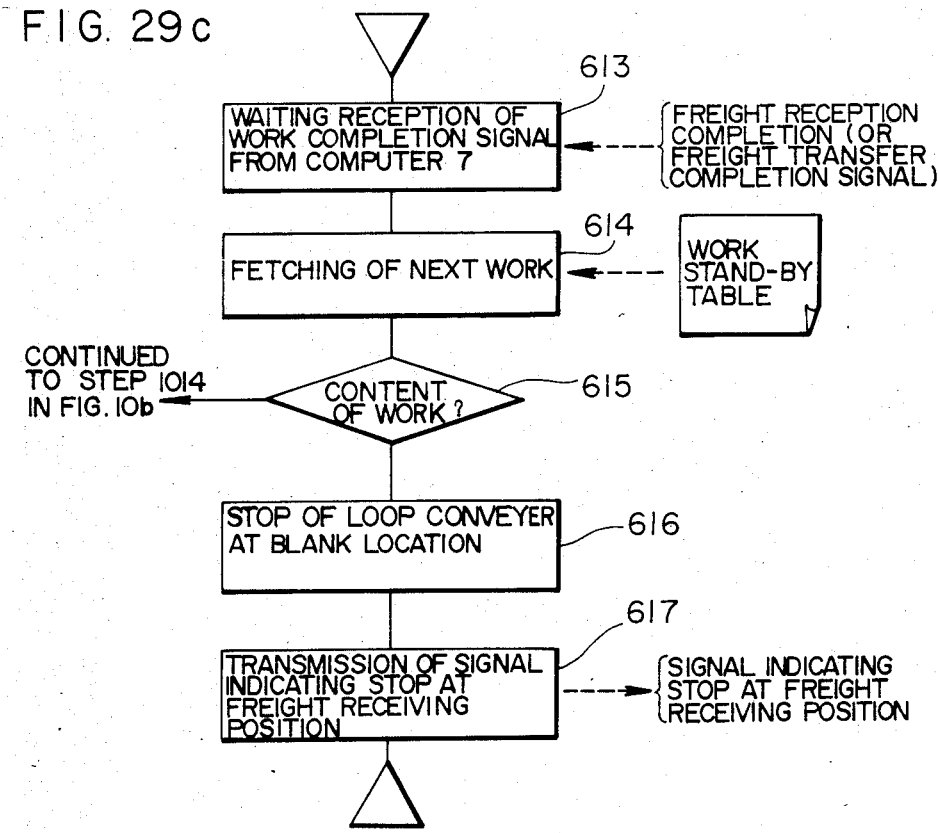

FIG. 30

| FREIGHT NAME | LOADING POSITION | | | LOADING DIRECTION |
|---|---|---|---|---|
| | x | y | z | |
| FREIGHT No. 1 | 0 | 20 | 0 | LENG |
| FREIGHT No. 3 | 30 | 50 | 0 | WIDT |
| FREIGHT No. 5 | 60 | 20 | 0 | WIDT |
| | | | | |

FIG. 32

| OPERATION SEQUENCE | CENTER COORDINATES OF ARM | | | OPEN/CLOSE OF ARM |
|---|---|---|---|---|
| | x | y | z | |
| 1 | -50 | -10 | 0 | OPEN |
| 2 | -50 | -10 | 1000 | CLOSE |
| 3 | 50 | 80 | 10000 | CLOSE |
| | | | | |

| LOADING No. | FREIGHT CODE | LOADING POSITION | | | LOADING DIRECTION |
|---|---|---|---|---|---|
| | | X | Y | Z | |
| 1 | S 0 1 | 0 | 0 | 0 | L |
| 2 | S 0 1 | 800 | 0 | 0 | L |
| 3 | S 0 2 | 1600 | 0 | 0 | L |
| 4 | S 0 1 | 0 | 600 | 0 | L |

FIG. 41

| LOADING ORDER | LOADING NO. | FREIGHT CODE | LOADING STATE |
|---|---|---|---|
| 1 | 7 | S01 | 1 |
| 2 | 8 | S01 | 0 |
| 3 | 10 | S03 | 0 |
| 4 | 4 | S01 | 0 |

FIG. 42

| LOADING ORDER | OPERATION NODE NO. | OPERATION POSITION x | y | z | SPEED | INTER-POLATION | OPERATION | TIMER | OPERATION STATE |
|---|---|---|---|---|---|---|---|---|---|
| 1 | 1 | -800 | 0 | 400 | 0 | 1 | 1 | 10 | 1 |
| 1 | 2 | -800 | 0 | 800 | 10 | 1 | 1 | — | — |
| 1 | 3 | -600 | 0 | 1050 | 10 | 1 | 1 | — | — |
| 1 | 4 | 1500 | 0 | 1050 | 10 | 1 | 1 | — | — |

FIG. 43

| FEEDING ORDER | FREIGHT CODE | SUPPLY STATE |
|---|---|---|
| 1 | S01 | 9 |
| 2 | S01 | 1 |
| 3 | S03 | 0 |
| 4 | S01 | 0 |

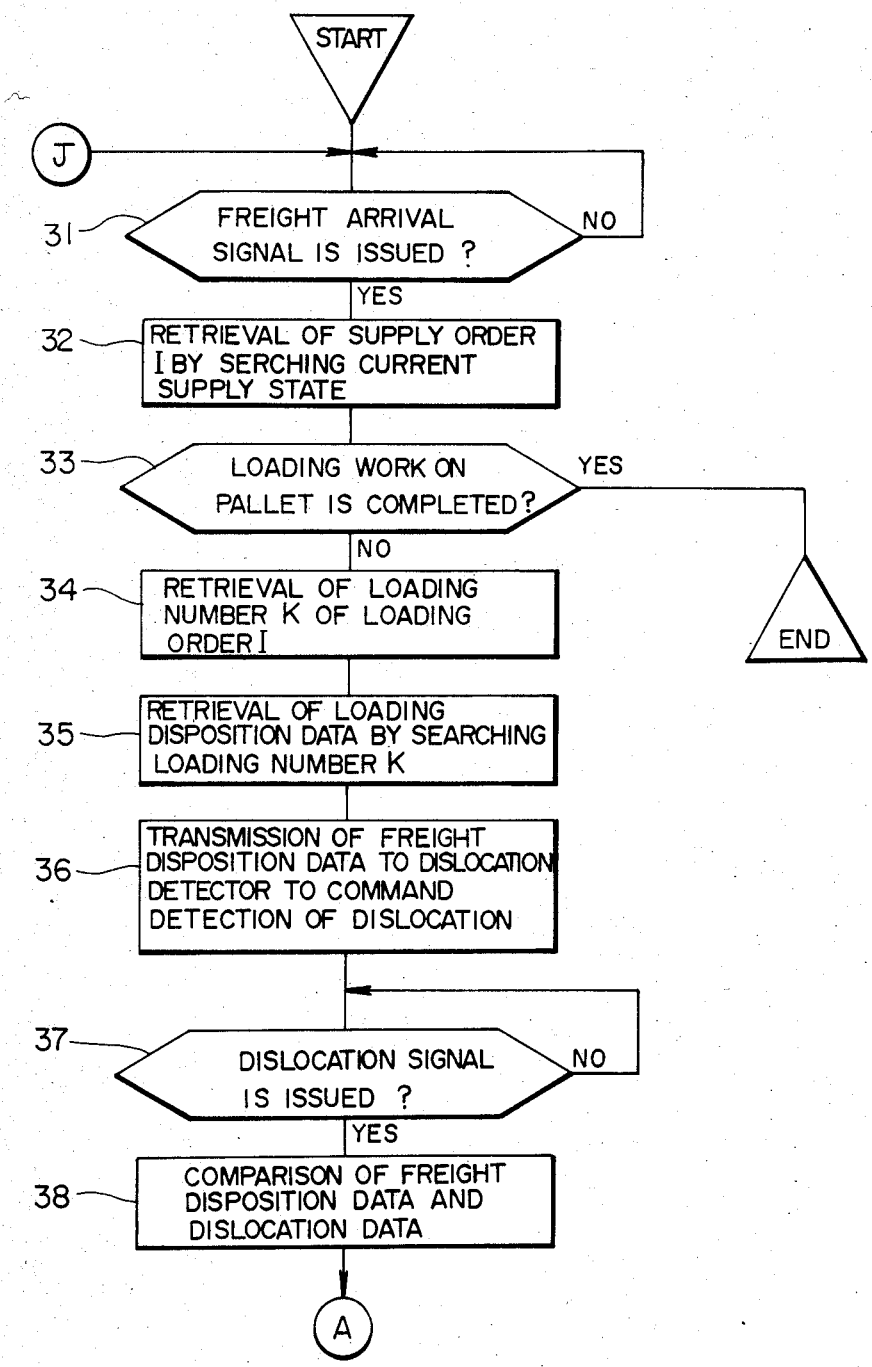

AUTOMATIC FREIGHT STACKING SYSTEM

BACKGROUND OF THE INVENTION

The present invention relates to an automatic freight stacking or loading apparatus suited for use in a dispatching or shipping system which is capable of loading or stacking freight articles of different configurations such as those to be dispatched from a factory operating on a mass-production basis, air cargo, parcels or packages for home delivery onto transportation means such as containers, pallets or the like within a relatively short time.

There are freight dispatching or shipping systems of two different modes or types mentioned below.

Type 1: Freight articles to be dispatched are loaded or stacked in accordance with a shipping schedule as in the case of the freight shipping system adopted in a factory operating on the mass-production basis, wherein the number of transportation means such as container, pallets or the like which are to be delivered in a day as well as the number, size and other factors of freight articles to be stacked or loaded on each of the transportation means are predetermined and entered in the shipping schedule.

Type 2: A shipping system in which freight articles are determined in respect to the size, the number and other factors only after the articles have arrived at the system, whereupon they are loaded or stacked on the transportation means within a short time. The shipping system of this type is adopted in a freight distribution center.

In connection with transportation of knockdown parts of automobiles and air cargo, by way of example, there arises increasingly a demand for automating work or operation for loading articles of freight or cargo on the transportation means such as pallet, container or the like. As the equipment for automatically stacking freight articles on the transporting means, there have been known an autopalletizer and a palletizing robot (also referred to as robot palletizer). As to the palletizing robot, reference may be made to articles "Effort in Development of Palletizing Robot" by Okura Transport Machine Co. and "Palletizing Robot 500" by Mizutsu and Ohtoshi, presented in "'83 Industrial Robot" published August, 1983 by Industrial Research Agency in Japan.

However, the hitherto known autopalletizer and palletizing robot can only load the articles of a same size, configuration and material on a given pallet. Accordingly, in view of the fact that there is an increasing tendency for transportation of numerous types of articles each in a reduced amount, the conventional palletizing robot suffers a great disadvantage in that it cannot handle the articles in the case where many different kinds of freight articles are to be loaded or stacked on one and the same pallet.

More specifically, in the case where a variety of the freight articles of different sizes are to be automatically loaded on one pallet by means of the conventional loading machine such as the palletizing robot, there arise serious problems mentioned below.

[I] Problems of the Type-1 loading system (i) Since the freight articles which can be handled by this type of conventional loading system are limited in respect to the configuration or shape, size and the material (reference may be made to the literatures mentioned above), such palletizing robot has not been known which can handle both cardboard boxes (article of rectangular prism) and bags (article of any given configuration). Besides, the palletizing robot destined to handle the cardboard boxes is imposed with limitation in respect to the volume, weight and size. For example, there may arise such situation in which palletizing robots for handling the articles of small and large volumes, respectively, are needed. In that case, a number of the loading or stacking systems of different types must be employed for loading the various types of articles on a single pallet. In this connection, it is often observed that pallets are inevitably transferred among the loading apparatuses a number of times in dependence on the loading sequence, resulting in an increase of work time wasted because of the time required for the transfer or movement of the pallet. Accordingly, it is necessary to, determine the loading order or sequence such that the reciprocating movements of the pallet among the loading or stacking apparatuses can be reduced.

(ii) When disposition or layout of freight articles on the transportation means is to be determined by personnel, all the combinations of dispositions of the individual articles cannot be predicted because the number of such combinations amounts to an enormous value, thereby resulting in the reduction of loading efficiency in reation to the available loading or stacking space of the pallet. Accordingly, there exists a need for a method of disposition which allows an increased loading efficiency to be realized even when freight articles of different sizes are to be loaded. The loading disposition or layout is herein referred to as the loading or stacking pattern.

(iii) In case freight articles are to be loaded successively by means of the loading apparatuses or palletizer robots each arranged to specifically handle the articles of predetermined shapes, loading operation of the articles has to be taught to the associated palletizer robot. In this connection, it is noted that the number of teaching steps becomes significantly increased in case the hitherto known playback teaching process is adopted, because the palletizing operation is different for every freight article. Accordingly, there exists a need for a method of automatically determining the freight loading order (or sequence) and the robot's operation sequence which are data to be taught to the palletizer robot, in addition to the aforementioned demand for preparation of the loading pattern.

[II] Problems of the Type-2 loading system

In the shipping or dispatching system in which the geometrical configuration of the article must be first determined before it can be loaded on the transportation means, the loading has heretofore been carried out by man power. However, from the standpoint of reducing personnel and others, there has been a demand for realization of the loading work by means of robots.

In the case of the Type-2 system, the sort and size of the article can be determined only after the arrival thereof. The size and the loading disposition of the article to be stacked differ from one to another transportation means. Consequently, in order automate the loading operation, determination of the article to be loaded and disposition thereof on the transportation means as well as teaching of operation path and closing or opening of robot's arms have to be done within a short time.

The above objectives cannot however be solved by the hitherto known teaching playback system (i.e. a system in which operator teaches a movement robot a path to be followed, including closing or opening of arms and other movements with the aid of a teaching box, so that the robot repeats the taught-in process).

SUMMARY OF THE INVENTION

A first objective of the present invention is to provide an automatic freight loading system which is substantially immune to the disadvantages of the prior art system and which is capable of enhancing the loading efficiency for loading freight articles of different configurations, i.e. different shapes, sizes and materials on given transportation means in accordance with any given loading demand while decreasing the number of times the transporation means are to be moved or transferred among the loading apparatuses installed for handling articles of different configurations, respectively, as well as the number of operation sequence teaching steps in the case of the Type-1 system.

A second objective of the present invention is to provide a robotized article loading system in which a robot can carry out the loading or stacking operation merely by giving the robot information of the rectangular parallelepiped articles to be loaded as well as the positions at which the articles are to be disposed on the transportation means which an operator determines by taking in consideration of the loaded and unloaded conditions on the transportation means in the case of the Type-2 system.

In view of the first mentioned object, there is provided according to an automatic freight loading system which comprises loading scheduler means for determining dispositions or locations at which articles are to be loaded on transportation means, loading sequence, allocation of loading apparatus and preparing operation sequences for a variety of the loading apparatuses, respectively, in response to designation of configurations (i.e. shape, size and material) of the freight articles to be loaded for transpotation, controller means for receiving data from the loading scheduler means to control various means of the system, marshalling means for receiving the articles in a given sequence and sending out the articles in accordance with the loading order, feeding means for feeding the freight articles supplied from the marshalling means to the location of the loading means designated by the loading scheduler, conveyer means for moving the transporting means to the location of the loading means designated by the loading scheduler means, and a group of loading means installed separately for every configuration of the freight articles and operative to load the freight articles of different configuration as supplied for feeding in accordance with the aforementioned operation sequences.

In accordance with another aspect of the invention intended for accomplishing the second objective, there are employed the following means:

(1) means for reading dimensions (size) of freight articles;
(2) loop conveyer means;
(3) graphic display unit;
(4) robot; and
(5) electronic computer;

wherein the freight articles are loaded or stacked on transporation means in the order described below.

At first, the size reader means reads the dimensions of the freight articles (i.e. length, width and height), freight articles being subsequently retained on the loop conveyer temporarily. Operator monitors the state of the freight articles staying on the loop conveyer and disposition of the freight articles on the transporting means with the aid of the graphic display unit, and supplies to the robot the information designating the freight article to be stacked and disposition or location at which the article is to be placed on the transportation means. The robot in turn picks up the designated article from the loop conveyer to place it at the designated location. These operation steps are sequentially executed repeatedly for loading the articles on the transportation means. The computer serves for controlling the sequence of operation steps as executed.

BRIEF DESCRIPTION OF THE DRAWINGS

FIGS. 8 to 12 are views for illustrating examples of various data stored in memories incorporated in the loading scheduler;

FIGS. 14 to 18 are views illustrating examples of data stored in memories incorporated in the controller;

FIG. 19 is a flow chart for illustrating operation of the loading scheduler;

FIGS. 20a, 20b and 21 to 23 are flow charts for illustrating details of operation of the controller shown in FIG. 13;

FIG. 24 is a view showing schematically a general arrangement of an automatic freight loading/stacking apparatus according to a second embodiment of the invention;

FIG. 26 is a view illustrating an example of loading data table;

FIG. 27 is a view illustrating an example of loop conveyer status table;

FIG. 28 is a view illustrating an example of operation-ready status table;

FIGS. 29a, 29b and 29c are flow charts illustrating processings executed by an electronic computer 10 shown in FIG. 24;

FIG. 30 is a view showing an example of loading pattern table;

FIG. 32 is a view showing an example of operation data table;

FIG. 39 is a block diagram showing interconnection among the individual units shown in FIG. 34;

FIGS. 40 to 43 are views for illustrating storage of various data in memories incorporated in the electronic computer 7 shown in FIG. 24; and FIGS. 44a and 44b show flow charts for illustrating operation executed by the computer 7 shown in FIG. 24.

DESCRIPTION OF THE PREFERRED EMBODIMENTS

Figure 1:
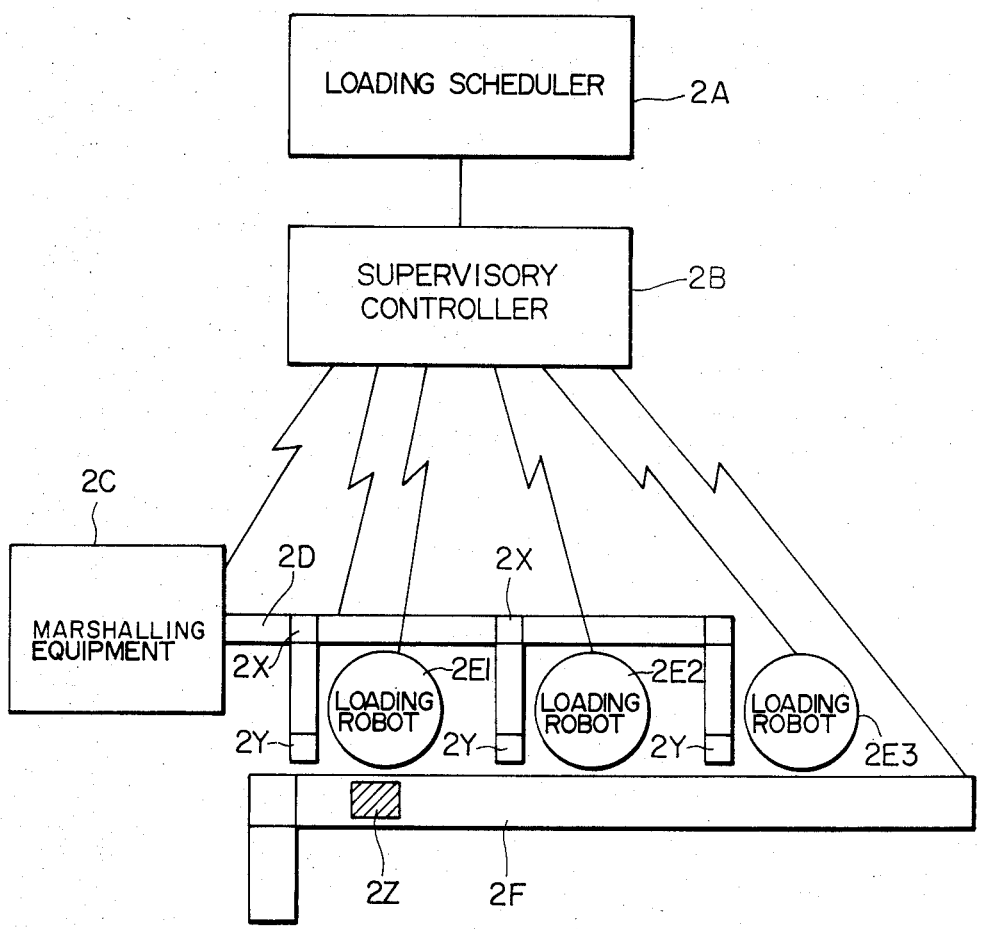
FIG. 1 is a view showing schematically a general arrangement of an automatic freight loading system according to a first embodiment of the invention.

In the following, the invention will be described in detail in conjunction with exemplary embodiments thereof by referring to the drawings on the assumption that a pallet is employed as the transporting means.

Figure 2:
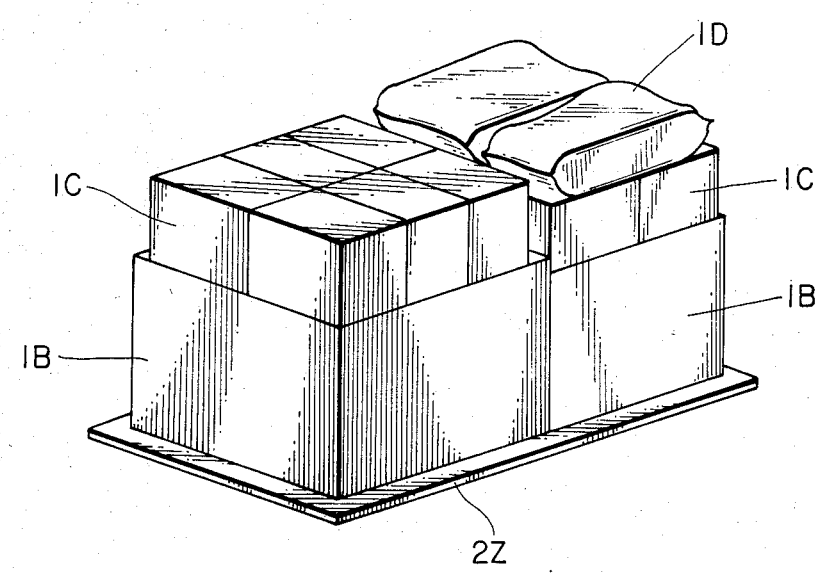
FIG. 2 is a view for illustrating freight articles of different configurations to be handled by the system according to the invention, the articles being shown in the state loaded and stacked on a pallet serving as the transportation means.

FIG. 2 shows, by way of example, a variety of freight articles of different configurations, sizes and materials in a state loaded on a single pallet.

In FIG. 2, reference symbol 2Z denotes a pallet, 1B denotes large size cardboard boxes (rectangular parallelepiped), 1C denotes small size cardboard boxes (rectangular parallelepiped), and 1D denotes bags (nonparallelepiped). Additionally, the freight articles may include those readily susceptible to deformation upon application of external forces (e.g. mail bags, coils of wiring conductors).

In the case of the instant embodiment of the invention, the large size cardboard box, the small size cardboard box and the bag are intended to be handled. The following description is based on the assumption that an automatic loading apparatus designed for handling the large size cardboard boxes, an automatic loading apparatus for handling the small size cardboard boxe and an automatic loading apparatus for the bags are employed for stacking a variety of the freight articles, on a single pallet. Further, it is also assumed that the allocation of freight articles to any particular one of the loading apparatus is dependent on the type of article to be loaded. For classification and, allocation of the articles, freight data are externally provided, for example, by a key board in the form of configuration discriminating codes (i.e. representative of the large size cardboard box, the small size cardboard box and the bag).

FIG. 1 shows schematically a general arrangement of an automatic freight loading or stacking system according to a first embodiment of the invention.

The automatic freight loading or stacking system includes a stacking or loading scheduler 2A, a supervisory controller 2B, a, marshalling equipment 2C, a feeding apparatus 2D, stacking or loading machines 2E1, 2E2 and 2E3 for the large size cardboard box, the small size cardboard box and the bag, respectively, a pallet conveyer 2F, and pallet exemplified by 2Z.

The loading scheduler 2A serves to prepare a loading or stacking pattern and determine the loading order (or sequence) as well as the operation sequence of the loading machine in response to reception of data of the configuration classifying codes mentioned above, dimensions or sizes and demanded loading amounts of freight articles to be loaded for transportation. More specifically, dimensional data of every freight article is inputted to the scheduler 2A which may be constituted by a computer to arithmetically determine the loading pattern, the loading sequence and the operation sequence of the loading machines on the basis of the input data, wherein the results of arithmetic determination are displayed on a character display or a graphic display (not shown). In this manner, the scheduler unit 2A can prepare data for the stacking or loading schedule in a conversational fashion with the operator operating key-board or the like input terminal.

The marshalling equipment 2C receives and stores the freight of articles and sends out the articles in the sequence or order in which they are to be loaded or stacked on the transportation means. Practically, there are established correspondence between the types of the articles and the identification numbers of storage shelves where the articles are stored, and the marshalling equipment may be constituted by a automatic warehouse system, a loop conveyer or the like capable of sequentially supplying the designated or required articles in the loading or stacking order or sequence.

The feeding or conveying system 2D serves to carry the articles received from the marshalling equipment 2C to the positioning station for loading on the pallet by the respective loading machines. Practically, this system 2D may be constituted by a conventional conveyer or the like. Connected to the feeding system 2D are a sorting unit 2X and a positioning station 24. The sorting unit 2X serves to receive the freight articles from the marshalling equipment 2C for sending out them out to the associated loading machines designated by the configuration classifying codes.

The loading or stacking machines 2E1, 2E2 and 2E3 function to load the respective designated or allocated freight articles on the pallet 2Z from the associated positioning stations, respectively, in accordance with respective designated operation sequences. In practice, the loading machine can be constituted by a robot. In the case of the instant embodiment of the loading system destined for loading the large size cardboard box, the small size cardboard box and the bag, it is a common practice from the standpoint of safety, that the large size cardboard boxes are placed at the bottom of a stack (e.g. situated on the pallet itself, then the small size cardboard boxes are disposed thereon, and the bags are disposed at the top. In this conjuction, it is to be noted that the loading machines or robots 2E1, 2E2 and 2E3 are disposed in a linear array, as shown in FIG. 1.

The pallet conveyer system 2F serves to receive an empty pallet for movement thereof among the loading machines 2E1, 2E2 and 2E3. In practice, this system may be constituted by a roller or chain conveyer.

The supervisory controller 2B transfers various signals with the aforementioned seven units 2A, 2C, 2D, 2E1, 2E2, 2E3 and 2F for controlling the various units in a coordinated manner. In practice, the controller may be constituted by a controlling computer.

Figure 3:
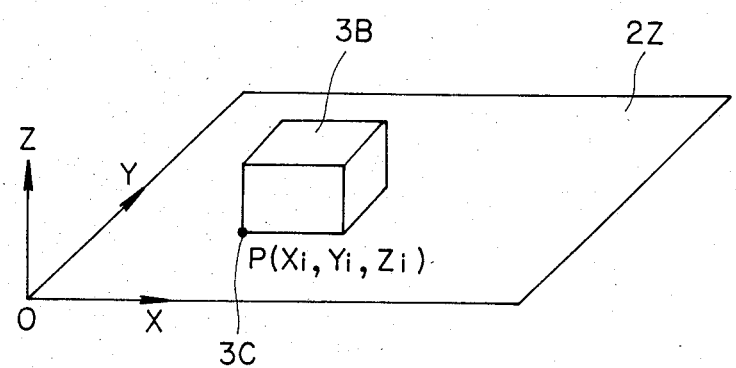
FIG. 3 is a view for illustrating positional relationship between a freight article and a pallet.

FIG. 3 is a view showing the position of a freight article on the transporting pallet.

Referring to the figure, when a freight article 3B is to be disposed on the pallet 2Z, an orthogonal coordinate system is established in which the origin ma be located, for example, at the left extremity of the loading machine (on the assumption that the machine is disposed on the front as viewed in FIG. 3). With the aid of the orthogonal coordinate system, the position of the freight article 3B on the pallet 2Z is designated. More specifically, the coordinates $P(x_i, y_i, z_i)$ of a point 3C of the article 3B which is nearest to the origin may be defined as the position on the pallet at which the freight article 3B is to be disposed. Orientation of the freight article may be determined such that the X-axis direction of the coordinate system coincides with the longitudinal direction (denoted by a symbol L) of the freight article 3B or alternatively with the direction widthwise of the freight (this direction is represented by a symbol S).

Figure 4:
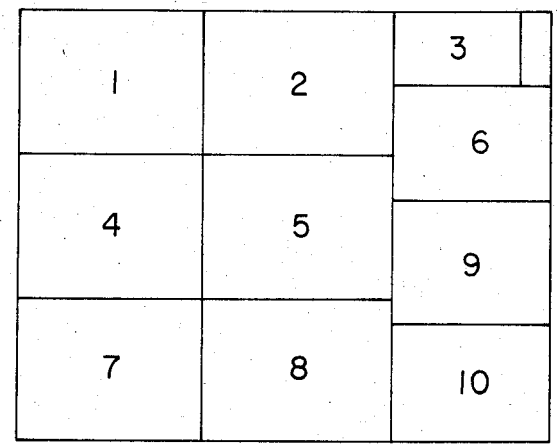
FIG. 4 is a view illustrating, by way of example, a loading order in which freight articles are to be loaded on a pallet.

FIG. 4 is a plan view for illustrating a sequence or order of loading articles on the pallet, by wa of example only. The loading order of freight articles on a plane is shown as indicated by ordinal numbers 1 to 10, which order or sequence is determined by the loading scheduler 1A in accordance with a previously established rule and displayed. In the case of the illustrated example, the rule is so effectuated that the loading or stacking of freight from the bottom to the top (i.e. stacking vertically upwardly) is assigned with the first priority, the loading from the rear side to the front side is allocated with the second priority, and the loading from the left end to the right end is assigned with the third priority.

In FIG. 4, the loading order is shown for the freight articles to be loaded by one and the same loading machine or robot. However, in case the freight articles are to be loaded on the pallet by means of the different loading machines or robots, it is necessary to determine the loading order such that the number of times the pallet moves among the loading machines is minimized. For example, assuming that only those freight articles to be loaded thirdly are handled by the loading machine for the small size cardboard box while the other freight articles are handled by the loading robot for the large size cardboard box, all the large size freight articles are first loaded, which is then followed by the loading of small size articles.

Figure 5:
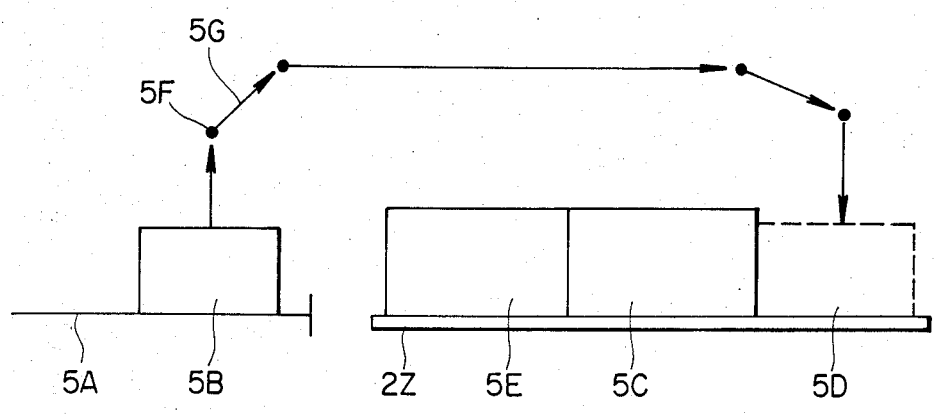
FIG. 5 is a view for illustrating, by way of example, operation sequence of a loading robot.

FIG. 5 is a view for illustrating, by way of example, the determination mode regarding the operation sequence of the loading machine or robot. It will be seen that a freight article 5B is disposed at a position 5D after moving along a path 5G passing a node 5F. More specifically, the freight article 5B on the feeding conveyer 5A is picked up by the robot and disposed on the pallet 2Z at the position 5D after moving over the freight articles 5E and 5C previously occupying the pallet 2Z. In other words, so far as the positions of the previously loaded articles 5E and 5C are known, the optimal path or route along which an article to be loaded is moved can be determined so as to evade the previously loaded articles. Since the positions on the pallet occupied by the freight articles 5E and 5C can be determined with reference to the coordinate system illustrated in FIG. 3, the operation sequence of the robot can thus be determined.

Figure 6:
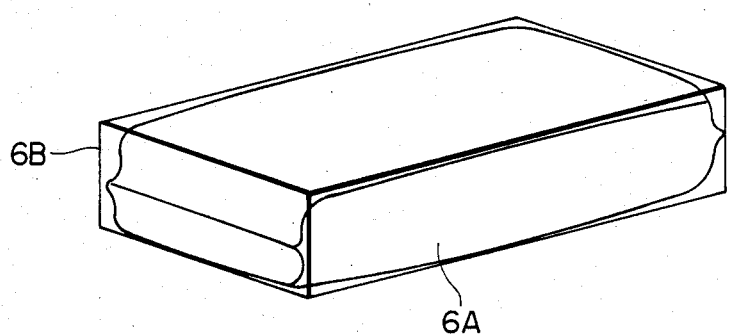
FIG. 6 is a view for illustrating approximation of a freight bag with a rectangular parallelepiped envelope.

FIG. 6 is a view for illustrating an approximation for a bag using a rectangular parallelepiped. More specifically, a bag 6A of non-rectangular parallelepiped configuration is approximated by a rectangular parallelepiped envelope which encloses the bag in contact.

According to the instant embodiment, the loading schedule data are prepared on the basis of the rectangular parallelepiped 6B. The bag loading robot 2E3 then determines the positioning of the bag by making use of the data obtained for the rectangular parallelepiped envelope to thereby load the bag on the pallet at the position and in the orientation as designated.

Figure 7:
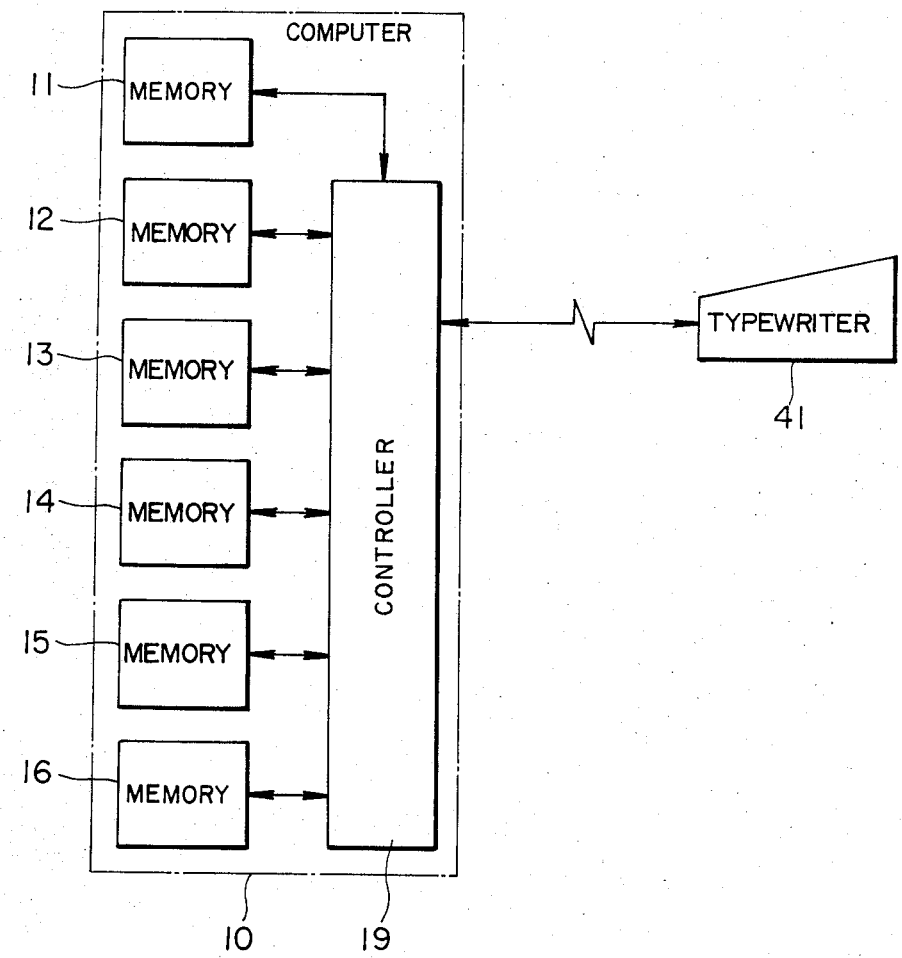
FIG. 7 is a block diagram showing schematically a general arrangement of a loading scheduler (2A) shown in FIG. 1.

FIG. 7 is a block diagram showing schematically an arrangement of the stacking or loading scheduler 2A shown in FIG. 1.

The loading scheduler 2A is composed of a computer 10 and a typewriter or keyboard 41 serving as a data inputting unit. The computer 10 includes memories 1, 12, 13, 14, 15 and 16 and a control unit 19 which operates in accordance with a program stored in the memory 11.

FIGS. 8 to 12 are views illustrating, by way of example, various data stored in the memories 12 to 16 incorporated in the loading or stacking scheduler 2A.

The memory 12 shown in FIG. 7 stores therein specification data of the previously registered pallets, which data are listed in a table, being classified in dependence on the types of the pallets, as is illustrated in FIG. 8. The memory 13 stores therein data of specification (length, width, height and weight), freight code indicating the identification number of the articles to be loaded in the form of data table and the requested loading amount in tabulated form, as shown in FIG. 9. These data are inputted by operator through the typewriter or input keyboard. In the case of the instant embodiment, the configuration classifying codes include three types of codes S, L and B indicating the small size cardboard box, large size cardboard box and the bag, respectively. Referring to FIG. 10, the loading pattern arithmetically determined on the basis of the data stored in the memories 12 and 13, i.e. the article loading position, direction and the identification number of the allocated loading machine are memorized in the tabulated form. In the case of the instant embodiment, the loading machine identifying numbers are "1", "2" and "3" designating, respectively, the large size cardboard box loading robot 2E1, the small size cardboard box loading robot 2E2 and the bag loading robot 2E3, respectively. Referring to FIGS. 11 and 12, the article loading order and the operation sequences of the individual loading robots that are arithmetically determined by the computer 10 on the basis of data stored in the memories 12, 13 and 14 are stored in the tabulated forms in the memories 15 and 16, respectively, as illustrated in FIGS. 11 and 12.

The data for the calculated loading (stacking) patterns, loading (stacking) orders and the operation sequences are stored in a set for each loading pattern, wherein the individual patterns are assigned with identifiers or names.

Figure 13:
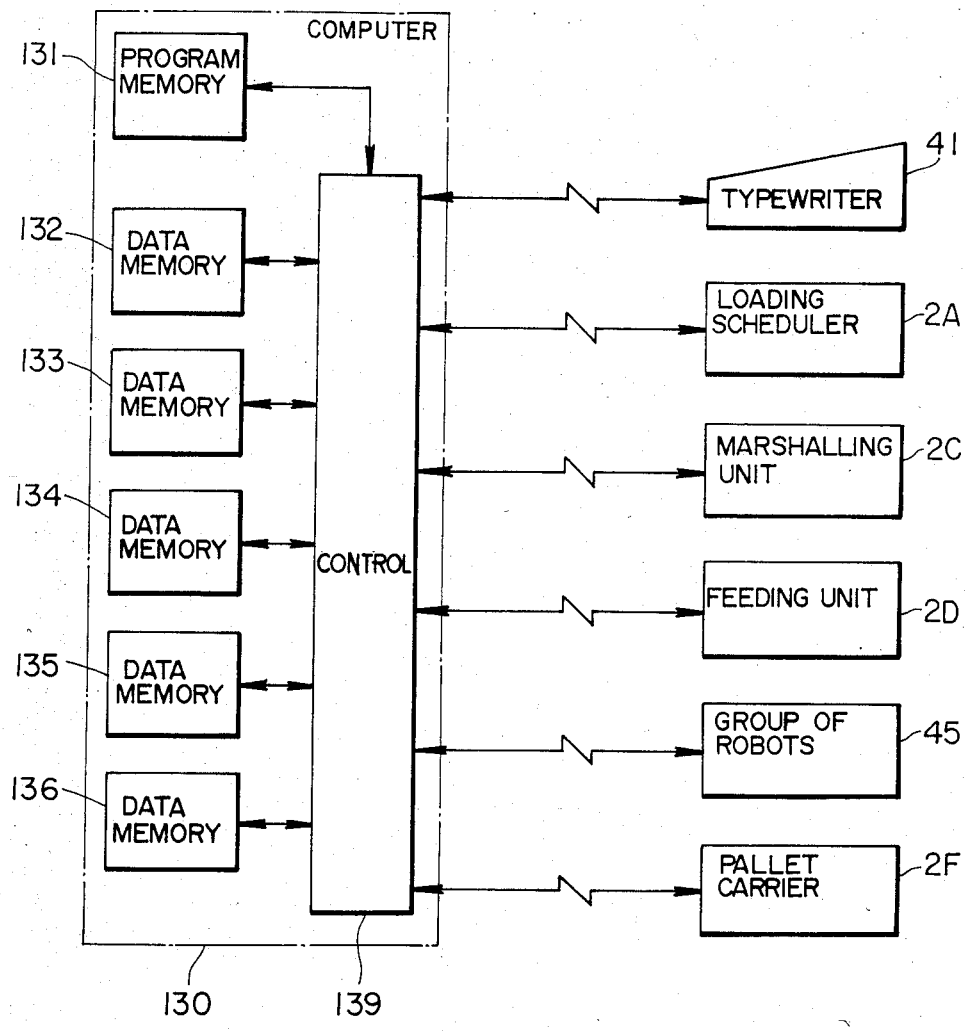
FIG. 13 is a block diagram showing a general arrangement of an overall or general controller.

FIG. 13 is a block diagram showing schematically a general arrangement of the supervisory controller 2B of the system shown in FIG. 1.

The controller 2B is composed of a computer 130 and a typewriter or keyboard 41. For illustrating connection among the controller 2B and other units, there are shown the loading or stacking scheduler 2A, the marshalling equipment 2C, the feeding apparatus 2D, the loading (stacking) machine 2E1, 2E2, 2E3 and the pallet conveyer 2F. The typewriter or keyboard 41 is employed for inputting data concerning the contents of the loading or stacking operation, i.e. name of the loading pattern and loading operation initiating activation.

The computer 130 is composed of a control unit 139 which operates in accordance with a program stored in a memory 131, and five data storages or memories 132, 133, 134, 135 and 136.

FIGS. 14 to 18 are views for illustrating various data stored in the memories of the controller 2B.

More particularly, referring to FIG. 13, the memory 132 incorporated in the computer 130 stores therein the content of the loading operation or work inputted through the keyboard 41, i.e. the work order in which the loading works are carried out for loading the given articles in a given pattern on a given transportation means, the name or identifiers of the loading patterns and the current situation or state of the work. The data of the current state or situation of work is supplied from the marshalling apparatus 43 and indicates the progress of the work.

Referring to FIG. 15, the memory 133 stores therein tabulated data of the loading order in which the articles are loaded on any one of the transportation means, the numbers of the allocated loading robots and the numbers indicative of the order in which the articles are loaded on an allotted one of the transportation means after produced by the loading or stacking scheduler 2A as well as the freight codes. Input signals produced by the loading robots and indicative of completion of freight loading operations are also stored as the information of current state or level of the loading operation.

Referring to FIG. 16, the memory 134 stores therein tabulated data of the robot's operation sequence produced by the loading soheduler 2A. Additionally the memory 134 stores the input signal issued by the loading robots and indicating the completed loading operations for each of the freight articles as the information about the current or present state of operation.

The memory 135 stores therein freight codes of freight articles previously stocked in the marshalling apparatus or equipment 2C and the associated shelf identifying inputted from the marshalling apparatus 2C in the form of tabulated data, as illustrated in FIG. 17. Every time the freight article is stocked in or leaves the marshalling equipment 2C, the corresponding signal is issued by the latter to update data of the state of stock or inventory, the updated data being stored.

Referring to FIG. 18, the memory 136 stores information of the supply order, the freight code and the current supply state transmitted from the marshalling equipment 2C and the feeding apparatus 2D. The information of the supply state is utilized for ascertaining whether freight articles are supplied to each of the robots.

Referring to FIG. 7, prior to initiating the loading operation, the operator has to select the code assigned to the requisite type of pallet from those of various pallets and input to the computer 10 the selected code by using the keyboard 41 for allowing the scheduler 2A to prepare the loading pattern representative of the pattern in which freight articles are to be loaded on the pallet as well as the loading or stacking order, allocation of the robots and the robot's operation sequence. Subsequently, the operator inputs to the computer 10, by means of the keyboard 41, the data of the freight articles, i.e. the freight codes, freight specifications and the required amount (number) of freight articles to be loaded. The computer 10 places these freight data at predetermined columns of the table shown in FIG. 9.

Next, computer 10 arithmetically determines the layout or dispositions (i.e. position and directon) of the individual freight articles on the selected or designated pallet having predetermined effective loading space. The loading or stacking pattern data thus determined and the robot number are placed at predetermined columns in the table shown in FIG. 10. Subsequently, the computer 10 arithmetically determines on the basis of the loading pattern and the robot number the order of loading (i.e. the loading order or sequence) according to which the freight articles are to be loaded onto the pallet, wherein the data resulting from this process are set at predetermined columns of the table, as shown in FIG. 11. Finally, the computer 10 arithmetically determines the robots' operation sequence on the basis of data of the loading pattern and the loading order. The data of the robots' operation sequence are then placed at predetermined columns of the table, as shown in FIG. 12.

FIG. 19 shows in a flow chart an operation procedure executed by the loading or stacking scheduler 2A (computer 10).

At first, the computer 10 is in the stand-by state waiting for the input of the pallet code data (step 50). Upon inputting of the pallet code data, a step 51 is executed, where it is decided whether the freight data, i.e. data of the freight codes, configuration classifying codes, freight specifications and the demanded loading quantity are inputted through the keyboard. Subsequently, the computer 10 places the inputted freight data in the data table (step 52). At a step 53, the computer 10 then arithmetically determines the positions and orientations of the individual freight articles within the effective loading space of the pallet on the basis of the pallet specification data corresponding to the pallet code inputted at the step 50 and the freight data inputted at the step 51, data resulting from this step 53 being stored at allocated columns of the table shown in FIG. 10. Further, at the step 53, it is determined which robot is allocated to a given freight article. At a step 54, the computer 10 arithmetically determines the loading order for loading the freight articles by the robot. Next, at a step 55, the computer 10 arithmetically determines the robot's operation sequence. The data thus obtained are stored.

Since the configuration identifying or classifying code entered at the time of inputting the freight data is definitely set in one-to-one correspondence with the allocated robot which is to handle the freight article attached with that code, a procedure may be adopted such that the direction of the large size cardboard box are first determined, being followed by a determination of the position and direction of the small size box, and finally the position and direction of the bag in the remaining space on the pallet are determined.

A set of the loading pattern, allocation of the loading robot, the loading order and the robot's operation sequence arithmetically determined by the computer 10 is attached with the pattern identifier or name. For example, a pattern name A is stored in the case of the example shown in FIGS. 10 to 12. The process including the arithmetic operations mentioned above is repeated, whereby various data sets as obtained are assigned with pattern names differing from one another.

FIGS. 20a, 20b, 21, 22 and 23 show in respective flow charts a program executed by the supervisory controller 2B shown in FIG. 1 (computer 130 shown in FIG. 13).

Figure 20B:
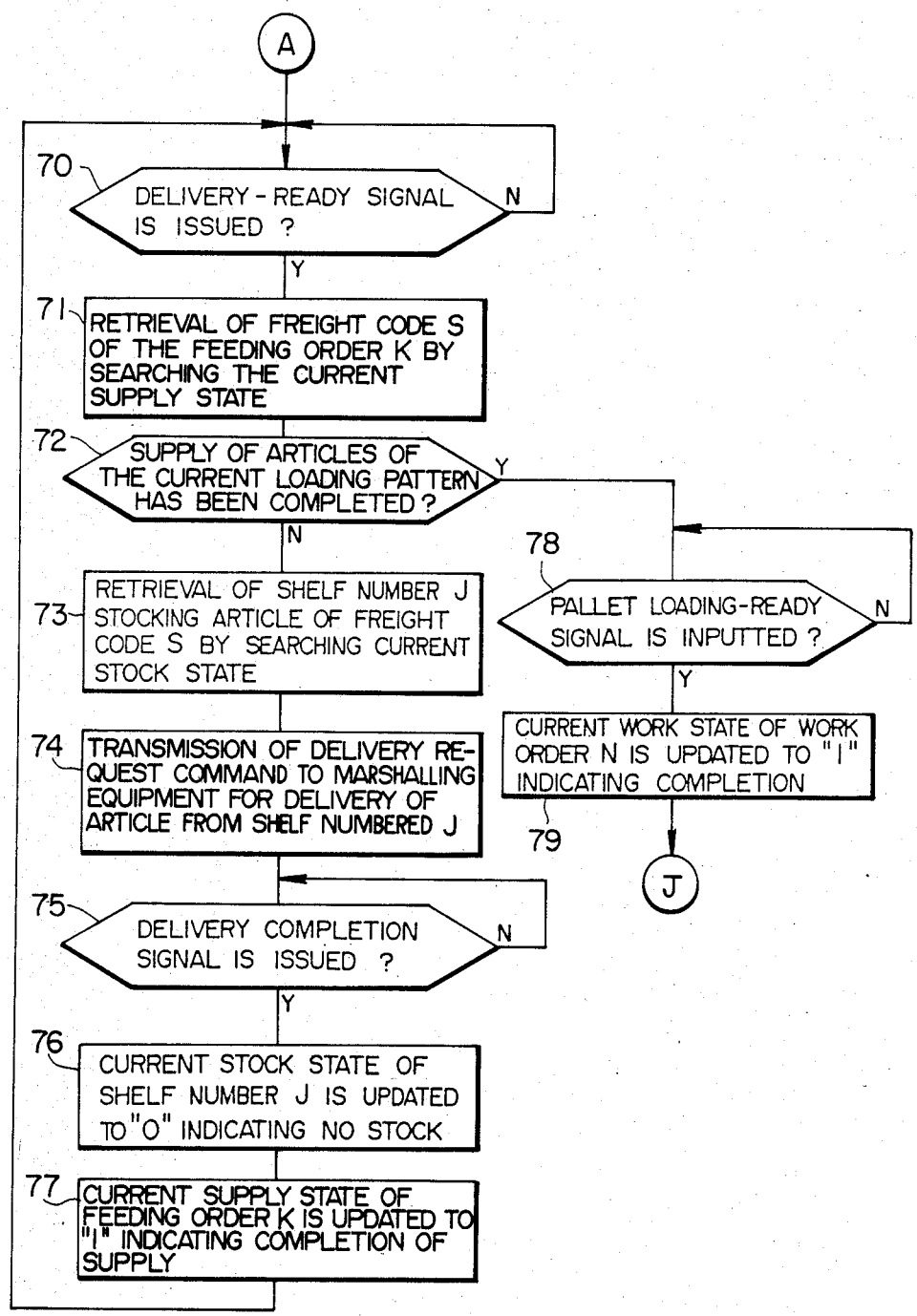

Among them, FIGS. 20a and 20b illustrate operations taking place between initiation of the loading or stacking operation and the feeding from the marshalling equipment 2C.

At first, the computer 130 is in the stand-by state waiting for work data (step 60). When the work data are present, data of the work order and the loading pattern name are registered through the keyboard (step 61) The steps 60 and 61 are repeated until the registration has been completed. Next, at a step 63, the computer 130 is in the stand-by state waiting for the inputting of the loading work initiation activating command. Upon inputting of the command, the computer 30 searches the current state of the work to retrieve the pattern name P of the work order N at a step 64. It is checked whether all the loading works have been completely performed at a step 65. If so, execution of the program comes to an end. Otherwise, a step 66 is executed where the computer outputs a request signal to the loading scheduler to request the loading schedule data of the pattern P (step 66). Then, the computer waits for the input of the loading schedule data (step 67). In response to the data input, the computer registers data of the loading order and the operation sequence corresponding to the pattern P (step 68). Next, from the loading order data, the supply or feeding order data is registered (step 69), whereupon the computer waits for the input of the signal indicative of the state ready for delivery (step 70). Upon inputting of the signal, the current supply or feeding state is searched to retrieve the freight code S of the supply order K in concern (step 71). Next, it is examined whether the supply of the articles corresponding to the pattern in concern has been completed (step 72). When the supply is not yet completed, the current stock state is searched to retrieve the identification number J of the shelf where the articles of the freight code S in concern are present (step 73), whereupon the delivery command is issued to the marshalling equipment, requesting the delivery of the article from that shelf of identification No. J. The computer then waits for the input of the delivery completion signal (step 75). Upon inputting of this signal, the current stock state of the shelf No. J is updated to "0", indicative of no stock (absence of freight) in the shelf numbered J (step 76). Additionally, the current supply state for the corresponding supply order K is updated to "1" (step 77), and the next delivery-ready signal is awaited.

When it is found at the step 72 that all the freight articles belonging to the pattern in concern have been supplied, the computer 130 is then in the standby state waiting for the signal indicative of the state ready for loading the freight on the pallet (this signal will be referred to as the loading-ready signal) (step 78). When the loading operation of the work order N has been completed, the current operation state data of the work order N in concern is updated to the state "1" indicative of the completed work (step 79). Thereafter, the step 64 is regained.

FIG. 21 is a view for illustrating the operation taking place when the freight articles delivered from the marshalling equipment 2C are transferred to the positioning stations for the loading robots designated by the loading scheduler 2A through the sorting apparatus 2X of the feeding system 2D.

At first, the input of the freight supply admission signal is awaited (step 80). In response to the input of this signal, the controller determines the supply order K and the loading robot identification number M is retrieved from the loading order of the supply order K (step 81). Next, a sorting signal commanding the freight supply to the positioning station of the loading robot of the identification number M is supplied to the feeding system 2D (step 82).

FIG. 22 shows a procedure for checking whether a pallet has arrived at the designated loading robot to be loaded with next freight article(s) after completion of the preceding loading and controlling the pallet conveyer 2F, if no pallet is present, to thereby move the pallet to the station of the designated loading robot.

At first, appearance of the freight loading completion signal is awaited (step 90). In response to the input of this signal, the current loading state is searched to retrieve the loading order i (step 91). Next, the loading robot identification code M of the retrieved loading order i is searched (step 92) with the instant position of the pallet also being searched to detect the loading robot of the identification code M (step 93). It is then checked whether retrieval of the loading robot identification numbers or codes has been completed (step 94). If not yet completed, a signal commanding the feeding of the pallet to the relevant loading robot of the identification code M is transmitted to the pallet conveyer system 2F (step 95). Next, appearance of the input signal indicating the arrival of the pallet to the relevant loading robot M is awaited (step 96). When the input signal makes appearance or when the retrieval performed at the step 94 has been completed, the loading command signal is transmitted to the loading robot M (step 97).

FIG. 23 shows in a flow chart a procedure for controlling the designated loading robot to thereby load the freight articles on the pallet in accordance with the predetermined operation sequence.

Referring to FIG. 23, the computer is first in the state waiting for the loading-ready signal (step 100). Upon reception of the loading command signal, the computer responds thereto for searching the current loading state to retrieve the loading order i (step 101) to check whether the loading work of the corresponding work order N has been completed (step 102). Unless the loading work has been completed, the operation sequence of the corresponding loading order i is searched to initialize the operating node number L to "1" (step 103). Now, the robot operation-ready signal is waited for (step 104). Upon reception of this signal, the operation command for the relevant operation node number L is supplied to the robot (step 105), wherein the signal indicating the completed operation for the corresponding node L is awaited (step 106). Upon reception of this signal, the current operating state at the corresponding node M is updated to "1", indicating the completed operation (step 107), whereupon the operation node number L is incremented (step 108). Next, it is checked whether the operation of the corresponding loading order i has been completed. Unless completed, step 105 is regained. Otherwise, the current loading state of the corresponding loading order i is updated to "1", indicating completion of loading (step 110), while the current supply state of the corresponding supply order i is updated to "−1", indicating completion of loading (step 111).

In the case of the embodiment shown in FIG. 7, it is assumed that the typewriter or keyboard 41 is employed as the data inputting means for the loading scheduler 2A. It should however be understood that an auxiliary memory medium such as a floppy-disc or the like may be employed or the scheduler may be connected on-line to another computer by way of a communication line for the data inputting. In the instant embodiment, the loading apparatuses 2E1, 2E2 and 2E3 for the large size cardboard box, small size cardboard box and the bag are constituted by robots, respectively. However, the invention is not restricted to the use of the robot. Although the separate computers 10 and 130 are used in the loading scheduler 2A and the controller 2B, respectively, it is self-explanatory that one and the same computer can be employed and operated on a time sharing basis. It has been described that information for selecting the loading robots for the freight articles of various configurations is inputted externally. It should however be appreciated that the selective allocation of the loading robots may be made automatically internally of the computer. Further, although the marshalling equipment 2C is assumed to be an automated warehouse, it is possible to use a multi-stage loop conveyor system including a plurality of superposed loop conveyors or a multi-stage rotary rack system including a plurality of superposed rotary racks to thereby increase the freight feeding speed. Additionally, for enhancing the reliability, the feeding apparatus 2D may be provided with the freight type identifying means such as those employing bar codes to identify the freight article delivered from the warehouse, whereby upon detection of abnormality in the delivery the system may be shut down. The positioning station 2Y of the feeding apparatus 2D may be provided with pusher or the like means for fixing the loading position to improve the positioning accuracy. The pallet may rest on the conveyor or a stationary base. In the above description, it has been assumed that three robots 2E1, 2E2 and 2E3 are employed. However, the invention is not restricted to any specific number and structure of the robots. In other words, a robot capable of handling articles of any given configuration in additon to the bag-like article or robot capable of handling article easily susceptible to deformation under external forces may be equally employed. In the flow charts showing the control operation of the controller 2B in FIGS. 20 to 23, it has been assumed for simplification of description that the freight articles to be loaded on a succeeding pallet are stocked in the marshalling equipment 2C without being fed until the loading operation for the preceding pallet has been completed. However, in order to promote the loading operation or work, control may be made in such a manner that feeding of the freight to be loaded on the succeeding pallet is started even when the loading to the preceding pallet is in progress.

In the case of the embodiment shown in FIG. 7, the computer 10 arithmetically determines the loading pattern on the basis of data stored in the memory 12 (pallet specification data) and those stored in the memory 13 (freight specification and amount data). However, it is possible to determine the loading pattern on the step-by-step basis through conversation with operator by referring to the loading state displayed on a graphic display device.

As will be appreciated from the foregoing description, the present invention has now provided an automatic freight loading or stacking system in which loading layout or loading pattern is previously determined for a given freight loading request, and the loading order as well as the operation sequence of the loading robot are automatically determined, so that freight articles to be loaded are automatically determined, so that freight articles are automatically supplied to the group of loading robots in accordance with a given order or sequence. Thus, the automatic freight loading system according to the invention allows the loading efficiency to be significantly increased even for the articles of different sizes, while the number of manipulative steps for teaching to the loading robots as well as the number of steps for supplying the freight articles arrived at the loading station in an arbitary order can be reduced. Further, because of the previous allocation of the robots, the work time is prevented from increasing as a result of increase in the number of movements of the pallet among the loading robots.

Next, description will be made on an automatic freight loading or stacking system according to a second embodiment of the invention.

Figure 25:
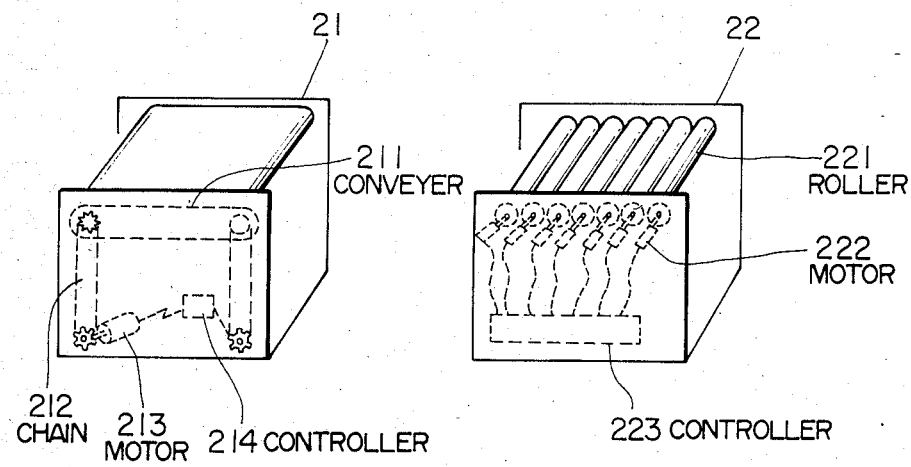
FIG. 25 shows schematic perspective views of a chain conveyer and a roller conveyer, respectively.

FIG. 24 shows schematically a general arrangement of the automatic freight loading system according to the second embodiment. A reference numeral 1 denotes a reader for reading sizes or dimensions of freight articles. The reader 1 may be composed of an infrared ray transmitter and a receiver, wherein the size of the article may be determined through calculation on the basis of the time duration in which the infrared ray is not received due to interception of the beam path by the article. Alternatively, a bar-code reader may be employed to read a code or label indicative of the size of the article to which the code is affixed. A numeral 2 denotes a carrier system for carrying articles onto a loop conveyer. In practical applications, the carrier system may be realized in the form of a chain conveyer system 21 in FIG. 25, composed of a conveyer 211, chains 212, an electric motor 213 and a controller 214 or in the form of a roller conveyer system 22 composed of rollers 221, a motor 222 and a controller 223 or alternative in the form of a robot. The rotational speed, start and stop operations of the loop conveyer 3 is cntrolled by a loop-conveyer control apparatus 4 which may be constituted by a micro-computer, while the loading robot 5 for picking up an article from the loop conveyer and loading it on the pallet and a graphic display terminal 6 is under the control of an electronic computer 7.

In the following, operations of the individual units will be described in accordance with operation sequence.

In the first place, a process for placing articles onto the loop conveyer will be elucidated.

Dimensions (length, width, height) of the article as supplied are read out by means of the reader, wherein the resulted data are transmitted to the electronic computer 7.

The computer 7 in turn stores the incoming article size data in a loading data table (FIG. 26) incorporated in the computer. Additionally, the computer 7 issues an article receiving command to the carrier or transfer apparatus.

Subsequently, the computer refers to a so-called "loop-conveyer state table" (FIG. 27) indicating the presence of articles on the loop-conveyer and transmits to the loop-conveyer control apparatus 4 a signal indicating empty or blank location on the loop-conveyer. In FIG. 27, addresses marked with BLANK in ellipse represents the blank or empty locations.

The carrier apparatus 2 responds to the reception of the article receiving command issued by the electronic computer 7 to receive the article from the reader 1, whereupon the apparatus 2 sends to the computer 7 a signal indicating the completion of article reception from the reader 1.

On the other hand, the loop-conveyer control apparatus 4 stores in a so-called "stand-by work table" (FIG. 28) the information of the blank location on the loop conveyer as received from the computer 7. The information of blank location is placed in a colomn 281 labelled "ARTICLE LOCATION". Referring to FIG. 28, a lable "LOAD" represents the work of transferring article to the robot 5, while "UNLOAD" means the work of receiving article from the carrier apparatus 2. The loop-conveyer control apparatus 4 reads out the work name stored in the leading row of the "stand-by work table" for performing the corresponding work upon completion of the work of receiving the article from the carrier apparatus 2 or the work of transferring the article to the robot. In the following description, it is assumed that the command for receiving the article from the carrier 2 is issued. In accordance with the article receiving command, the loop-conveyer control apparatus 4 stops the loop conveyer at the blank or unloaded location in accordance with the article reception work command as read out. Subsequently, a signal indicating the stop of the loop conveyer at the article receiving position is transmitted to the electronic computer 7.

In response to the signal mentioned just above, the electronic computer sends a unloading initiation command to the carrier apparatus 2, which then transfers the article carried thereon onto the loop conveyer. Subsequently, signal indicating completion of the unloading work is transmitted to the electronic computer 7.

After reception of the signal indicating completion of the unloading work from the carrier apparatus 2, the electronic computer 7 supplies to the reader 1 the signal commanding initiation of the size reading for the succeeding freight article and at the same time supplies to the loop-conveyer control apparatus 4 a signal indicating completion of the article transfer to the loop conveyer.

In the foregoing, description has been made of the operations taking place between the arrival of freight article and the placing thereof on the loop conveyer.

Figure 29A:
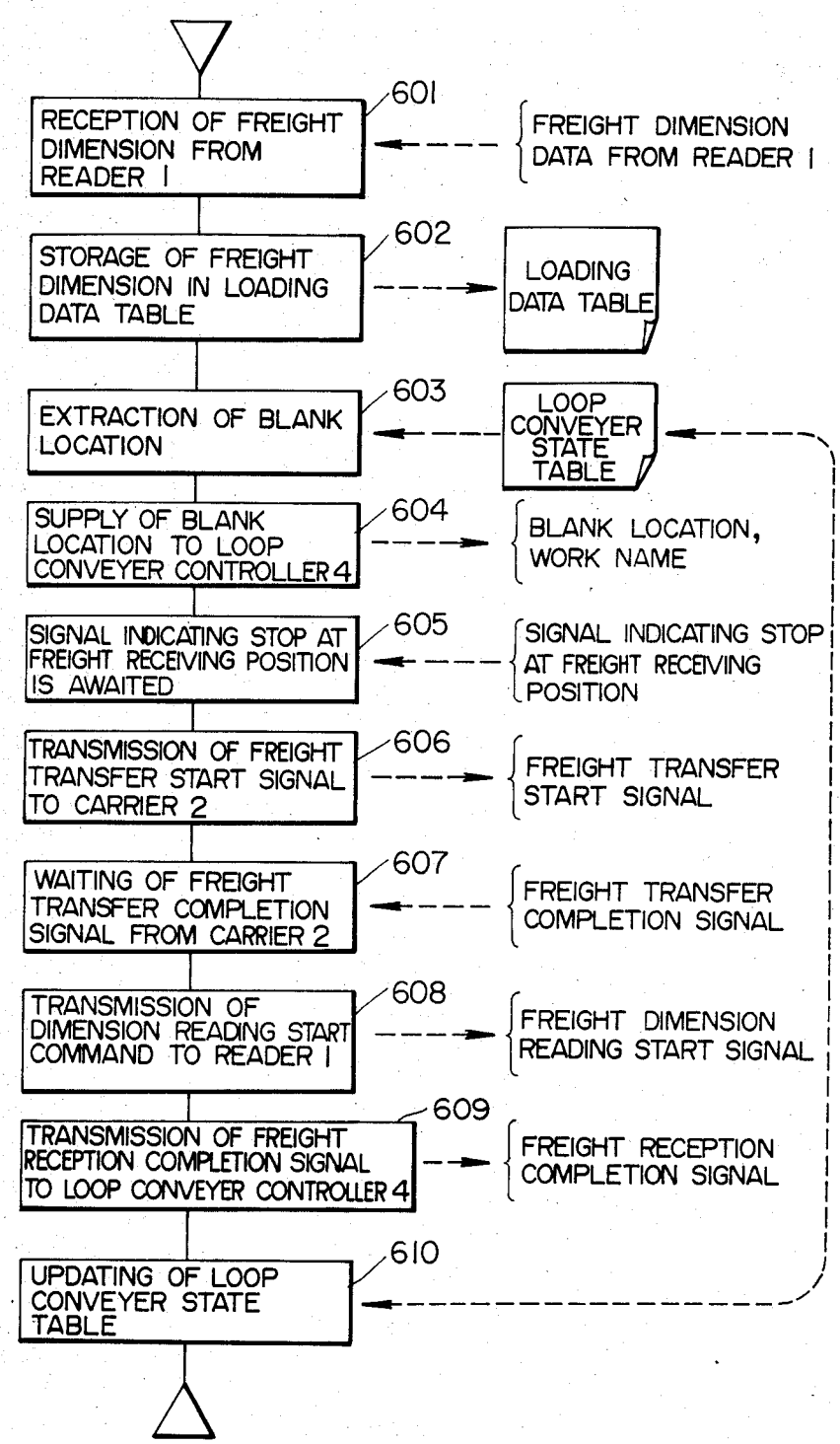

FIG. 29a shows in a flow chart a processing procedure or program executed by the electronic computer 7. More specifically, referring to the figure, dimension (size) data of the freight article measured by the reader 1 is received at a step 601 and stored in the loading (or stacking) data table at a step 602. Subsequently, a blank location on the loop conveyer is determined by referring to the "loop-conveyer state table" at a step 603. The blank location and the work name (i.e. article receiving work) are transmitted to the loop-conveyer control apparatus 4 at a step 604. The computer then waits for the signal indicating the stop of the loop conveyer at the position for receiving the freight article (step 605), which signal is supplied from the loop-conveyer control apparatus 4. Upon reception of this signal, the unloading initiation command signal is supplied to the carrier apparatus 2 at a step 606. Subsequently, the signal indicating completion of the unloading operation from the carrier apparatus 2 is waited for at a step 607. Next, the size reading command is supplied to the reader 1 at a step 608. Additionally, the signal indicating completion of the freight transfer operation is transmitted to the loop conveyer control apparatus at a step 609.

Finally, the loop-conveyer state table is updated at a step 610.

In the foregoing, the procedure executed under the control of the computer 7 has been described.

FIGS. 29b and 29c show flow charts of procedures or programs executed by the loop-conveyer control apparatus 4. Description will be made on a procedure for storing the work name and the blank location (or loaded location) in the work stand-by table (FIG. 29b), as well as a procedure for receiving the freight article (FIG. 29c). Describing the first mentioned procedure, the control apparatus 4 waits for data of the work name and the blank or unoccupied location (or loaded location) supplied from the electronic computer 7 (step 611). Received data are stored in the work stand-by table at a step 612.

Turning to the freight receiving procedure shown in FIG. 29c, the control apparatus 4 receives the work completion signal from the computer 7 at a step 614. After the reception, the content of work to be next performed is stored in the work stand-by table at a step 614. It is checked at a step 615 whether the work in concern is for the freight reception or for the freight transfer. In the former case, the loop conveyer is stopped at the empty location at a step 616. Thereafter, the signal indicating that the loop conveyer has stopped at the empty or blank location is transmitted to the electronic computer 7.

In the foregoing, the procedure or program executed by the loop conveyer control apparatus 4 has been described.

Next, operation for loading the freight article onto a pallet from the loop conveyer 3 will be described.

Figure 31:
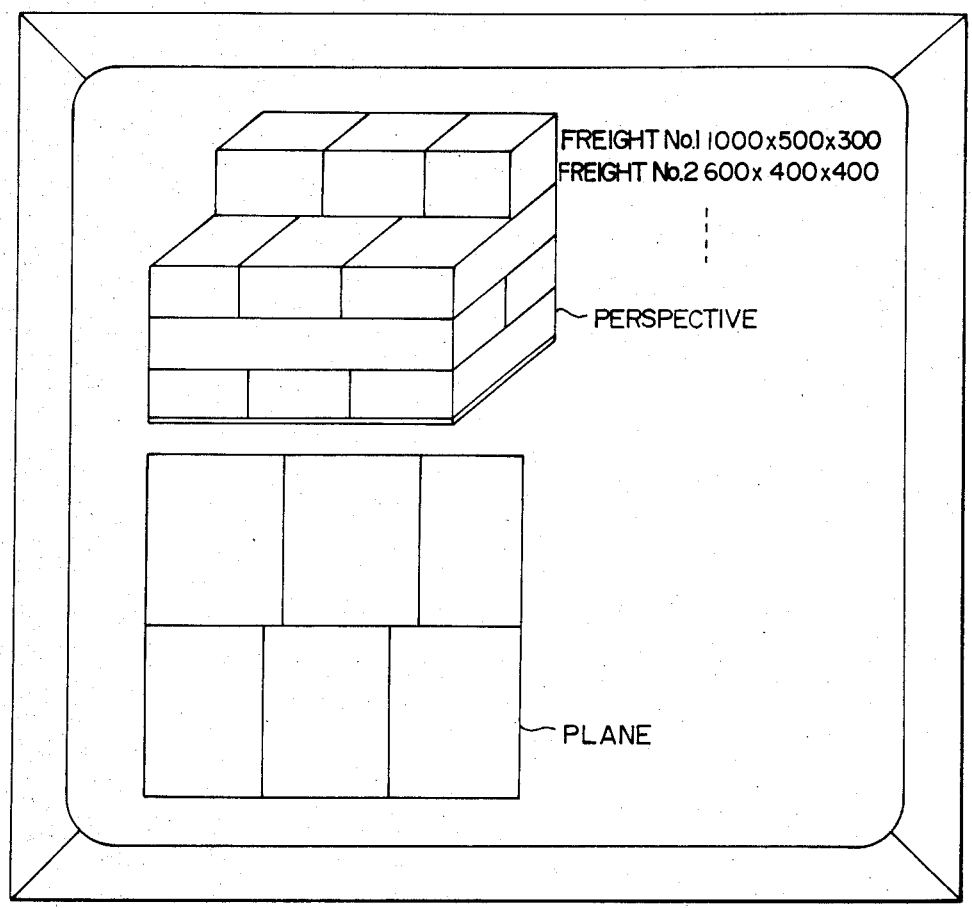
FIG. 31 is a view illustrating, by way of example, a display of loaded or stacked freight articles and a loading layout produced on a screen of a display unit.

The electronic computer 7 refers to the loading data table and the loading pattern table (FIG. 30) in which the positions or locations of the freight articles loaded on the pallet are stored, to display the loaded articles and the loading accept positions on the screen of the graphic display terminal 6, as illustrated in FIG. 31. Referring to FIG. 30, with the phrase "loading position", it is intended to designate the coordinates (x, y, z) of the left rearmost point of a freight article with reference to the origin (0, 0, 0) assumed to be located at the left rearmost point of the pallet. Further, the terms "loading direction" means the direction of a side of the freight article with reference to the left side of the pallet. The label "WIDT" indicates the widthwise direction while "LENG" indicates the lengthwise direction.

Operator designates a freight article to be loaded as well as the loading position with the aid of a stylus pen or a light pen on a tablet provided to each pallet.

The electronic computer 7 refers to the loop-conveyer state table (FIG. 27) to issue the designated loading position or location on the loop conveyer and requests the loop conveyer control apparatus 4 for the freight transfer to the robot.

The loop conveyer control apparatus 4 stores the infomation of the article loading position supplied from the computer 7 in the work stand-by table.

The loop-conveyer control apparatus 4 reads out the content of work stored in the leading row of the work stand-by table. If the work is to transfer the freight article to the robot, the control apparatus 4 stops the loop conveyer at the loading location or position. Subsequently, the signal indicating that the conveyer has stopped at the freight transferring position is supplied to the electronic computer 7.

After reception of the signal mentioned above, the computer 7 prepares an operation path of the robot as well as arm opening/closing commands (FIG. 32) for reaching the loading position designated by the operator. The data thus prepared are supplied to the robot 5.

The robot 5 in turn picks up the freight article from the loop conveyer and loads it on the pallet in accordance with the operation path and arm opening/closing data received from the electronic computer 7. The latter waits for the signal indicating completion of the article transfer operation.

Upon reception of the signal indicating completion of the article transfer operation from the robot 5, the electronic computer 7 issues to the loop-conveyer control apparatus 4 a command for terminating the article transfer operation.

Figure 33A:
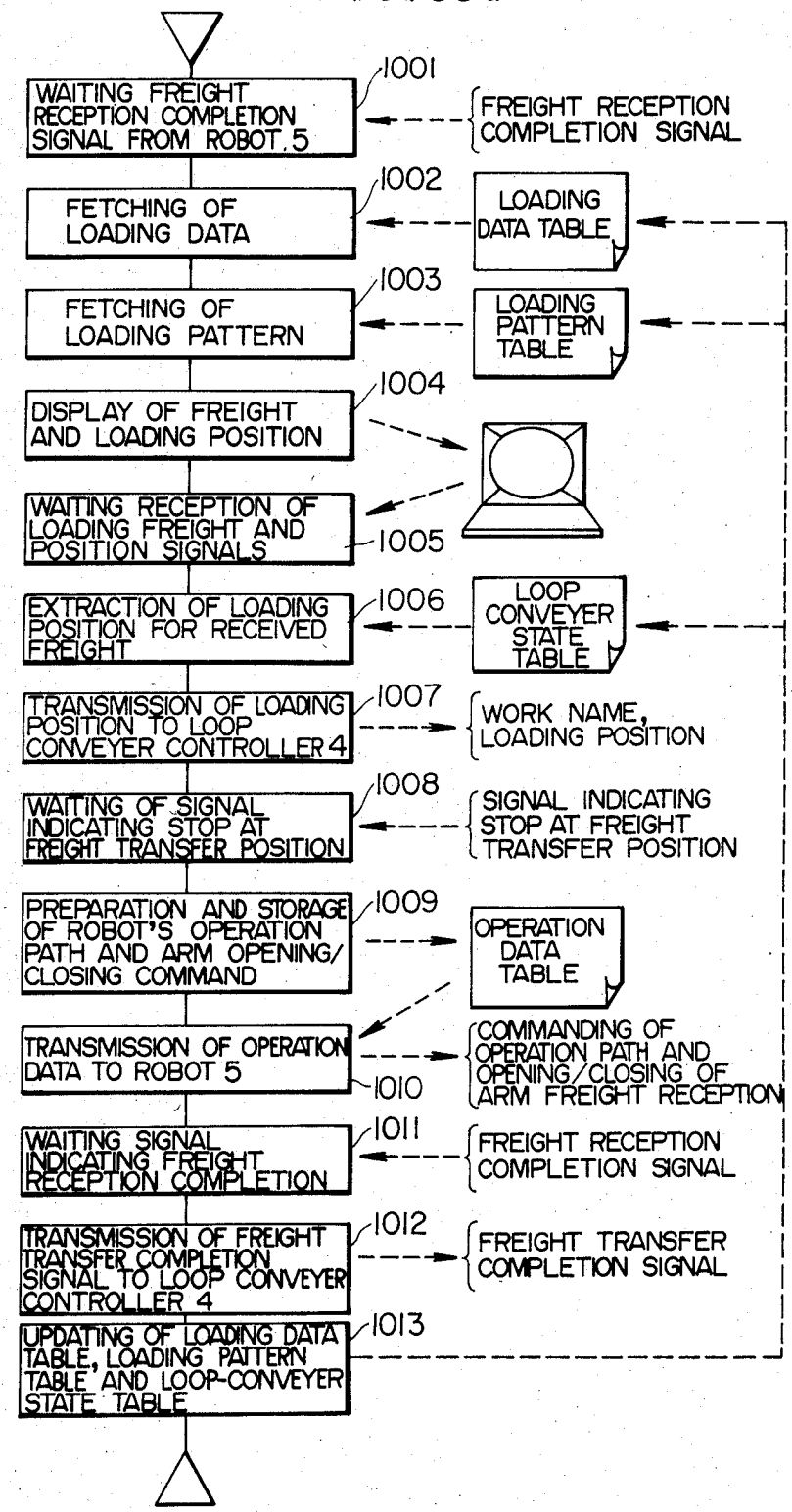
FIGS. 33a and 33b are flow charts for illustrating loop conveyor control processing executed by the electronic computer 7 shown in FIG. 24.

In the foregoing, one cycle of transferring the article from the loop conveyer onto the pallet has been described. FIG. 33a shows a control flow executed by the electronic computer 7, and FIG. 33b shows in a flow chart the procedure or program executed by the loop conveyer control apparatus.

First referring to FIG. 33a, a signal indicating completion of the freight reception is received from the robot 5 at a step 1001. After the reception, the content of the loading data table and that of the loading pattern table are read out at steps 1002 and 1003, respectively. On the basis of the data thus fetched, the freight article to be loaded as well as the location where the articles to be disposed are displayed on the graphic display terminal 6 at a step 1004. Subsequently, at a step 1005, the data of the freight to be loaded and the loading location are received from the graphic display terminal 6. Next, at a step 1006, it is determined where the freight article, whose data has been received, is located on the loop conveyer by referring to the loop conveyer state table. At a step 1007, data of the determined freight position and the work name (freight transferring work) are transmitted to the loop conveyer control apparatus 4. At a step 1008, a signal of stopping the loop conveyer at the freight transferring position is received from the loop conveyer control apparatus 4. Subsequently, the operation path of the robot, the arm opening/closing command and the operation sequence are prepared at a step 1009 to be stored in an operation data table. At a step 1010, the operation data prepared at the step 1009 are transmitted to the robot 5. At a step 1011, a signal indicating completion of the freight reception is received from the robot 5, whereupon the signal indicating completion of the freight transfer to the robot is transmitted to the loop conveyer control apparatus 4 at a step 1012. At a step 1013, contents of the loading data table, the loading pattern table and the loop conveyer state table are updated. In the foregoing, the control flow executed by the electronic computer 7 has been described.

Figure 33B:
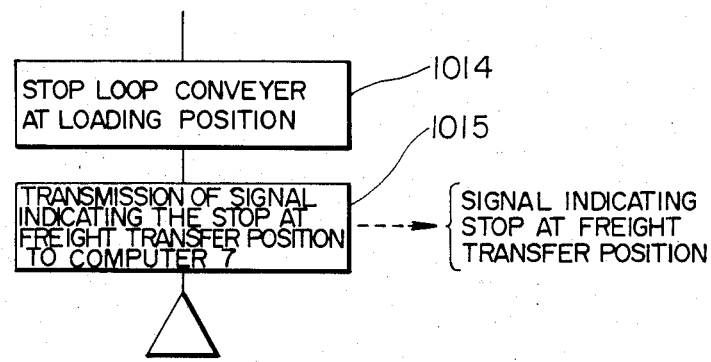

Next, reference is made to FIG. 33b. In case the work content read out from the work stand-by table is the freight receiving work, in the step 615 of FIG. 29c, the loop conveyer is stopped at the loading position also read out form the work stand-by table at a step 1014. Subsequently, a signal indicating that the loop conveyer has stopped at the freight transfer position is transmitted to the electronic computer 7.

In the case of the system according to the instant embodiment, the cycle described above is repeated until the freight loading work for one pallet has been completed.

Next, description will be made on a version of the second embodiment of the invention by referring to FIGS. 34 to 44c.

The automatic freight loading apparatus according to this version is adapted to correctively modify the operation for loading a freight article upon occurrence of positional misalignment or deviation of the precedingly loaded article in the course of automatically loading the requested freight articles on a pallet.

In the hitherto known automatic freight loading apparatus, the loading pattern and the loading sequence are previously determined, wherein the freight articles are disposed on the pallet at the predetermined positions in accordance with the loading sequence, to thereby enhance the loading efficiency for a given available loading space. However, due to dimensional error of the freight article and the loading or positional error on the pallet, there often occurs deviation of the loaded freight article from the predetermined position, resulting in that a freight article now being loaded is improperly placed into the position where another freight article is to be next loaded. In other words, the freight article to be next loaded is prevented from being disposed at the predetermined location, to a serious disadvantage.

In the automatic loading system according to the modified embodiment in which the loading pattern is previously determined in consideration of limitation of the available space on the pallet and in which the freight articles are automatically loaded or stacked on the pallet in accordance with the loading pattern, it is proposed that when a freight article being instantly loaded is improperly placed into a position where another freight article is to be next disposed due to the dislocation of a precedingly loaded freight article, the operation sequence is so modified as to allow the loading operation to be continued. To this end, the automatic freight stacking system is composed of three units (a), (b) and (c) mentioned below. When a freight article to be next loaded cannot be disposed at the location predetermined for that freight article due to dislocation of the precedingly loaded article, (i) only the operation sequence is modified, or (ii) both the loading order and the operation sequence are altered.

The three units (a), (b) and (c) are:

(a) an automatic loading unit for loading or stacking automatically in accordance with the loading pattern or loading disposition on the pallet which has been previously registered, (b) dislocation detecting means for detecting whether or not a freight article already loaded is improperly placed into the position where another freight article is to be loaded subsequently, and (c) an supervisory controller for controlling both of the above mentioned units.

Figure 34:
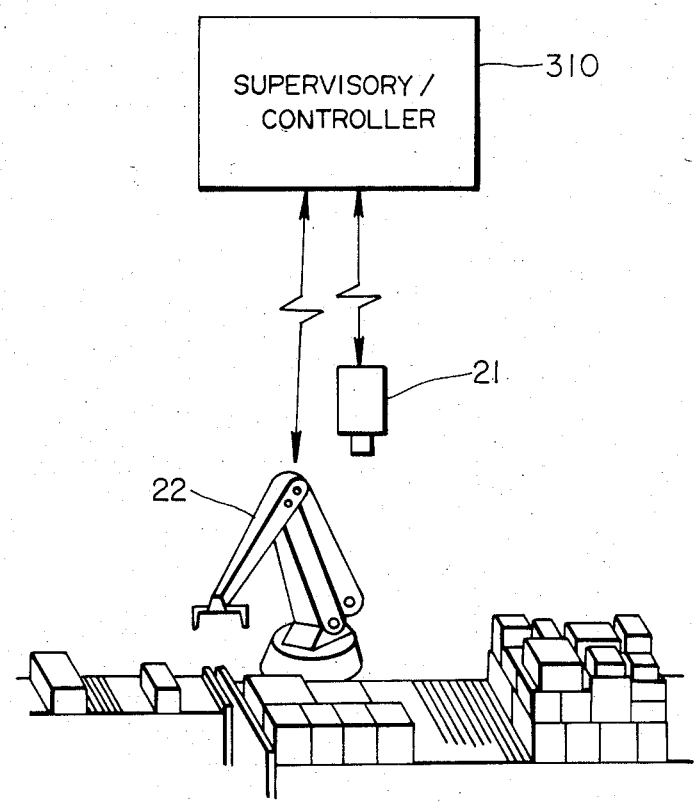
FIG. 34 is a block diagram showing schematically a general arrangement of a version of the automatic freight loading/stacking system according to the second embodiment.

FIG. 34 is a block diagram showing a general arrangement of the modified automatic freight stacking system.

Referring to FIG. 34, the automatic loading unit or apparatus 22 may be constituted by a palletizing robot designed to load freight articles from a loading station onto a pallet in accordance with a previously established operation sequence.

The positional deviation or dislocation detector 21 may be constituted by a sensor adapted to scan the loaded pallet with an infrared beam or ultrasonic wave for detecting the dislocation of the loaded freight article(s).

The supervisory controller 310 may be constituted by a computer which transfers signal with the two apparatuses mentioned above for controlling them in a coordinated manner.

In the following description, it is assumed that all the freight articles are of rectangular parallelepiped and that dimensions of the articles are previously known.

The operation sequence of the robot is so determined that the freight articles are to be loaded on a pallet in the positional relationship illustrated in FIG. 2 in accordance with the loading order illustrated in FIG. 4 through the loading operation following the optimum operation path illustrated in FIG. 5.

Figure 35:
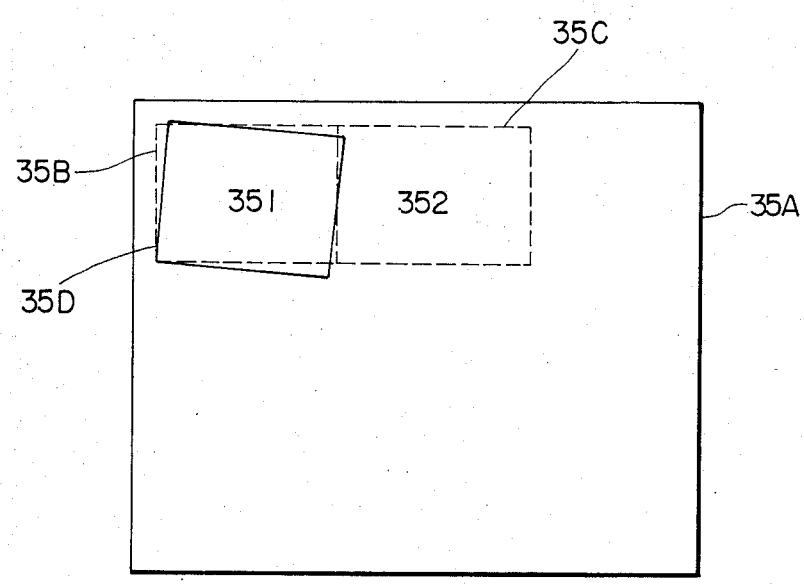
FIG. 35 is a view for illustrating positional deviation or misalignment of a loaded article.

FIG. 35 is a view illustrating a loaded state of an article 351. A broken line block 35B indicates a position previously determined for the article 351 in the loading pattern, while a broken line block 35C represents a position for a freight article 352 also previously determined in the loading pattern. Now, it is assumed that the freight article 351 is disposed at such a position as indicated by a solid line block 35D.

Figure 36:
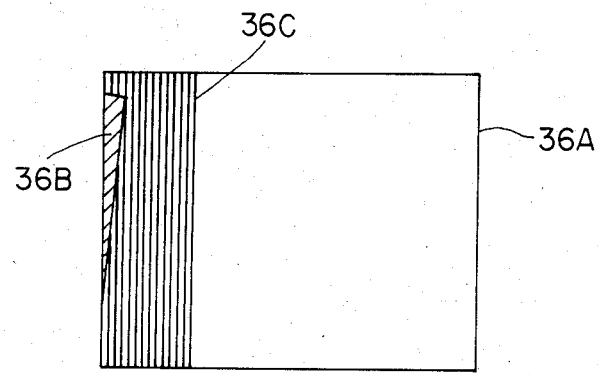
FIG. 36 is a view for illustrating detection of positional misalignment or dislocation of a loaded article through scanning with infrared ray.

FIG. 36 illustrates scanning of the pallet with the dislocation detector in a region of the pallet in the vicinity of the freight article 352, wherein dislocation of the freight article 351 is detected. The range to be scanned is indicated by 36A. Dislocation (or positional deviation) 36B of the article 351 loaded already is detected with an accuracy determined by the interval or frequency of the scanning lines 36C. In case the positioning accuracy assured by the robot is 5 mm, the interval beetween any adjacent scanning lines is selected on the order of 5 mm.

Figure 37:
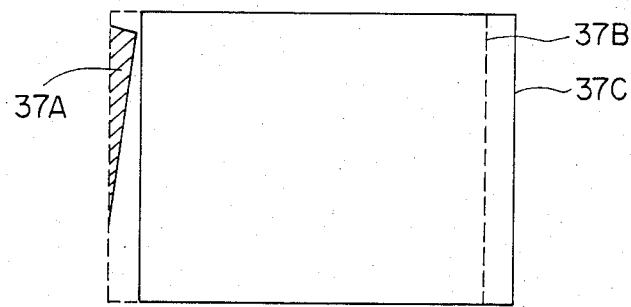
FIG. 37 is a view for illustrating dislocation of a loaded article due to positional misalignment of another loaded article.

FIG. 37 shows that the position of the freight article to be next loaded should be modified from the position 37B indicated by the broken line to the position 37C indicated by the solid line because of dislocation (FIG. 36) of the freight article 351 loaded precedingly. In consideration of the mutual positional relation among the freight articles predetermined by the loading pattern and the available loading space of the pallet, the position of the freight article to be next loaded should preferably be modified form the position 37B to the position 37C. This modification can be accomplished simply by altering the robot's operation sequence.

Figure 38:
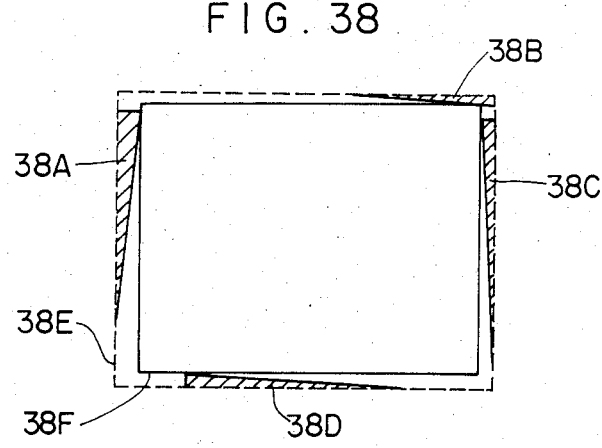
FIG. 38 is a view for illustrating a situation in which a loading of an article is inhibited due to positional misalignment of loaded surrounding articles.

Referring to FIG. 38, there may arise such situation in which the loading position can no more be modified in dependence on dislocations of the precedingly loaded articles. Reference letters 38A, 38B, 38C and 38D denote dislocations of the precedingly loaded articles. A broken line block 38E represents the position at which the article to be next loaded is to be disposed. In case four surrounding articles loaded previously are dislocated in this manner, the loading of the next article is rendered impossible. Under the circumstance, the loading of the next article is skipped, and another succeeding article is loaded. When there exists a freight article which should be disposed on the article whose loading has been skipped, the loading of the former is also skipped. In this manner, in consideration of the mutual relation among the articles in the loading pattern, the loading order is altered. Correspondingly, the operation sequence of the robot is also modified. The freight article which could not be loaded are taken out from the loading line and may be loaded manually after the automatic loading process.

Figures 39, 40:
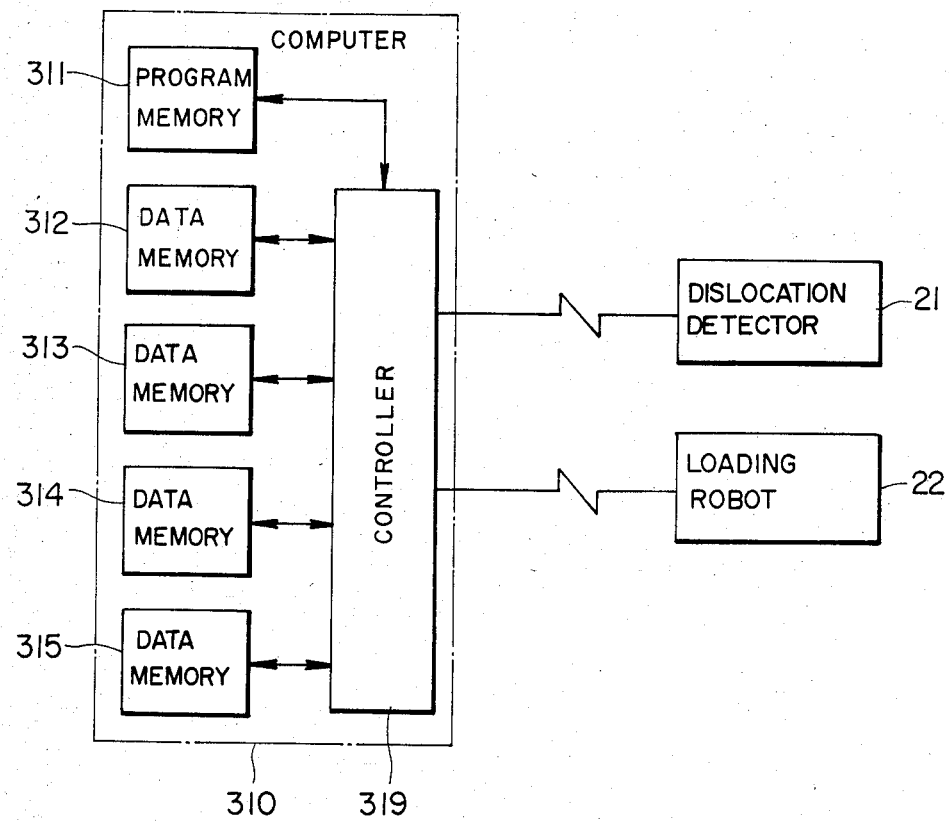

FIG. 39 is a block diagram showing a general arrangement of the supervisory controller 310 which is composed of a computer 310, the dislocation detector 21 an the automatic loading robot 22.

The computer 310 includes a control unit 319 operating in accordance with a program stored in a memory 311 and four data memories 312, 313, 314 and 315. There are stored in the memory unit 312, as shown in FIG. 40, the data of the previously prepared loading pattern in a tabulated form. The memory 313 stores therein the data of the previously prepared loading order also in a tabulated form, as illustrated in FIG. 41, by way of example. Stored in this table are information of the loading state (completion of loading indicated by "1", skip indicated by "−1" and loading in progress indicated by "0") which are inputted from the automatic loading apparatus or robot 21. The memory 314 stores therein the data of robot's operation sequence in the tabulated form, as is illustrated in FIG. 42. Also stored in the table shown in FIG. 42 are information of the operating states (completion "1", in progress "0") of the robot 21 corresponding to the operation node numbers. Finally, the memory 315 stores information of the supply state (arrival at the station "1", not arrived "0" and completion of the loading "9") inputted from the automatic robot in accordance with the supply order.

Figure 44B:
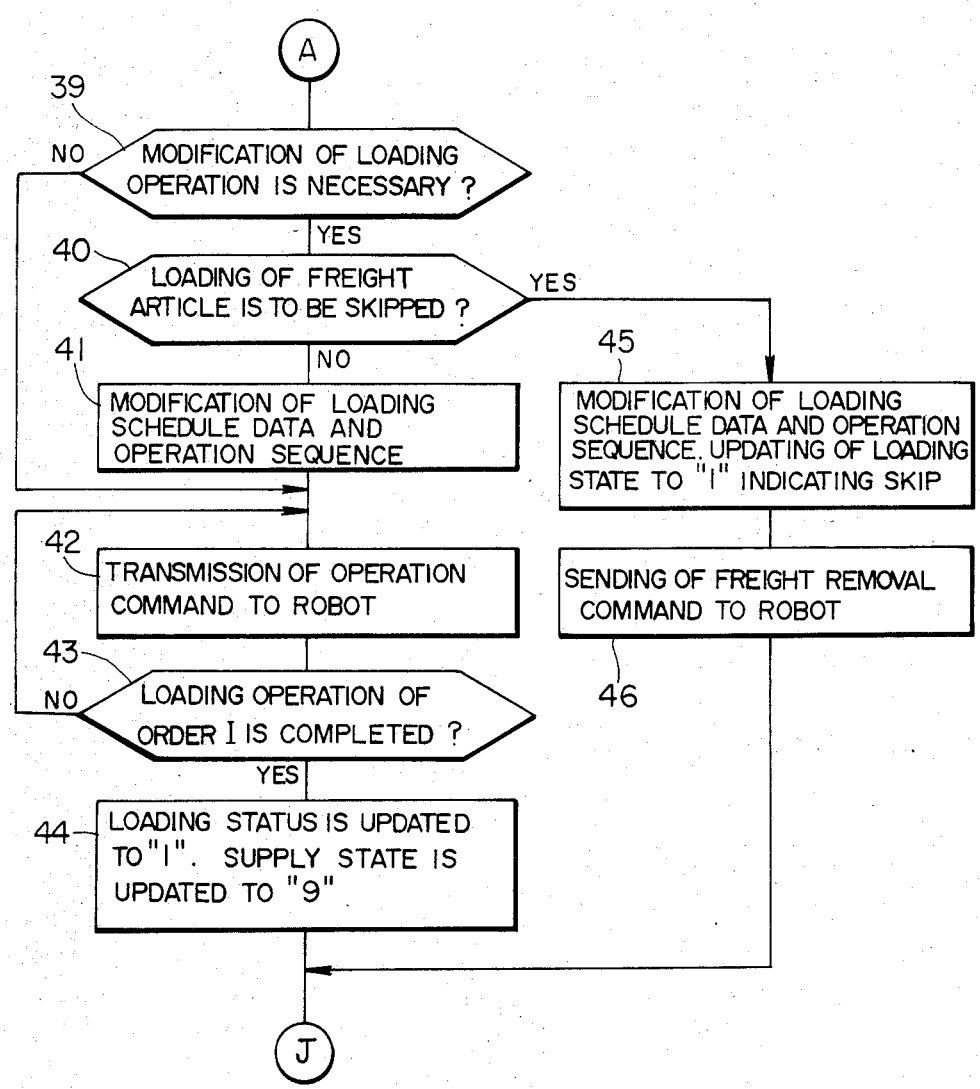

FIG. 44 illustrates in a flow chart the program stored in the memory unit 311 for allowing the supervisory controller to effect the control operation.

In the following, the control flow will be described in detail in the order of process steps.

STEP 31

Appearance of a signal indicating the arrival of a freight article is waited for. The palletizing robot 22 transmits the above signal to the computer 310 upon arrival of the freight article at the loading station.

STEP 32

The current supply state stored in the memory 315 is searched to set the leading bit of a bit series "0" indicating the non-arrival to "1".

STEP 33

When it is found at the step 32 that all the articles have been loaded, the control procedure comes to an end. Otherwise, the following step is executed.

STEP 34

The loading order I stored in the memory 313 is searched to retrieve the loading number K.

STEP 35

The loading position data (i.e. data of the loading position and direction) stored in the memory 312 are retrieved.

STEP 36

The loading position data retrieved at the step 35 transmitted to the dislocation detecting apparatus 21 together with a signal commanding detection of dislocation.

STEP 37

Information of dislocation is awaited. In the dislocation detecting apparatus 21, the region of the pallet where the freight article in concern is to be disposed is scanned by the sensor to examine whether the precedingly loaded article is dislocated to the position where the article in concern is to be disposed on the basis of the loading disposition or pattern data inputted at the step 36. The result of the examination is transmitted to the controller 319.

STEP 38

The result of the above examination is compared with the loading disposition data. In case the precedingly loaded article is displaced to the position destined for the article to be next loaded, it is determined in consideration of the positional relationship among the freight articles to be subsequently loaded, inclusive of that to be next loaded, whether alteration of the position of the article to be next loaded is sufficient or the loading of this article should be skipped.

STEP 39

When the comparison of the dislocation information supplied from the misalignment detecting apparatus 21 with the loading schedule data stored in the memory 312 (step 38) results in that no alteration of the robot operation is necessary, i.e. unless the precedingly loaded article is dislocated into the position predetermined for the loading of another freight article, a step 42 is executed. Otherwise, the following step 40 is executed.

STEP 40

When the result of comparison effected at the step 38 shows that the precedingly loaded article is dislocated to the position reserved for the article to be next loaded, necessitating thus alteration or modification of the loading operation, the loading schedule data for the articles subsequent to the loading order I (i.e. the article to be next loaded) are searched. When it is found that alteration of the position of the article to be next loaded is sufficient as described in conjunction with FIG. 37, then a step 41 mentioned below is executed. On the other hand, in case the position of the article to be next loaded cannot be altered or in case the succeeding articles cannot be loaded if the position of the article to be next loaded is altered, a step 45 described later on is executed.

STEP 41

The loading position of the article of the loading order I as well as those of the succeeding articles are modified. Corresponding data stored in the memory 312 are rewritten. Further, the operation sequence is again arithmetically determined on the basis of the rewritten data in the memory 312. The result of the calculation is stored in the memory 314 at a designated column.

STEP 42

The operation sequence data placed in the memory 314 is transmitted to the palletizing robot together with the signal commanding the loading operation.

STEP 43

The next operation sequence stored in the memory 314 is searched. When all the operation sequences for the loading order I in concern, a step 44 mentioned below is executed. Otherwise, the aforementioned step 42 is regained.

STEP 44

The loading state data stored in the memory 313 is updated to "1" indicating completion of the loading operation. Further, the supply state data in the memory 314 is updated to the state "9" indicating completion of the loading. Return is made to the step 31.

STEP 45

When the loading of the article of the loading order I is skipped, the loading data of the succeeding articles are examined to determine those articles which should be skipped in the loading. The loading state data stored in the memory 313 for the article to be skipped and other succeeding articles also to be skipped are updated to "−1" indicating the skip.

STEP 46

A removal command for removing the article to be skipped from the loading station of the palletizing robot is sent to the automatic palletizing robot which then responds to the command to thereby remove the article(s) from the line. Return is made to the step 31.

The present invention provides advantages mentioned below:

(1) For loading freight articles of different configurations (i.e. different shapes, sizes and materials) on transporting means, the loading efficiency can be enhanced, while the number of times the transporting means has to move among the palletizing robots provided separately for the freight articles of different configurations, respectively, can be reduced. Besides, the number of robot teaching steps can be decreased.

(2) Man power required for the loading work can be reduced, being accompanied with corresponding reduction in the personnel expenditure.

(3) Injury to the personnel due to accidental dropping of the freight article can be mitigated. In other words, safety of the loading work is enhanced.

(4) Simplification of the transportation control can be accomplished. Further, the addressee is protected from falling in trouble. More specifically, all the articles loaded on the pallet are accurately recorded by the computer. Thus, the delivery slip can be prepared by means of the computer. Mismatching between the delivered articles and entries in the delivery slip can be positively prevented. Besides, data of the loading position is protected from error.

(5) In case dislocation occurs in the loading of the freight articles, either alteration of the loading position and the operation sequence or alteration of the loading order and the operation sequence can be carried out in consideration of the prevailing situation. Thus, in spite of occurrence of the dislocation of the article, the loading operation can be continued, which means a significant improvement of reliability. In other words, since the loading work can be conducted in accordance with the predetermined loading pattern even when the latter is modified due to the dislocation of the article, the reliability of operation can be enhanced without involving degradation in the loading efficiency.

We claim:

1. An automatic freight stacking system comprising: loading scheduler means for determining respective loading positions of articles on a transporting means, the loading order of said articles, the allocation of a plurality of loading means and the preparation of an operation sequence for a plurality of freight articles of various configurations to be transported; marshalling means for receiving said freight articles in a given sequence and delivering said freight articles in a predetermined loading order; feeding means for supplying said freight articles from said marshalling means to the places of respective one of said plurality of loading means allocated to said freight articles, in dependence on the configurations thereof, by said loading scheduler means; conveyor means for moving said transporting means to the places of respective ones of said plurality of loading means allocated by said loading scheduler means; each of said plurality of loading means loading said freight articles allocated thereto in dependence on the configurations thereof on said transporting means in accordance with said operation sequence; and general control means receiving data from said loading scheduler means for controlling said marshalling, feeding, conveyor and plurality of loading means in a coordinated manner.

2. An automatic freight stacking system according to claim 1, wherein said loading scheduler means includes data storing means for storing first data of various transporting means, second data of the freight articles to be transported, third data of disposition of said freight articles on said transporting means prepared on the basis of said first and second data, the order of loading said freight articles, data corresponding to the allocation of said plurality of loading means, and the operation sequences of each of said plurality of loading means in a tabulated form, said first and said second data being inputted to said loading scheduler means before starting the article loading operation.

3. An automatic freight stacking system according to claim 1, wherein said general control means includes a first memory for storing information of work order and loading pattern name supplied externally and information of work state supplied from said marshalling means; a second memory for storing information of the loading order, identification numbers of each loading means of said allocated plurality of loading means supplied from said loading scheduler means and information of loading state signaled from said plurality of loading means; a third memory for storing information of the work state supplied from said loading scheduler means; a fourth memory for storing inventory and shelf information supplied from said marshalling means; and a fifth memory for storing information of supply state inputted from said marshalling means and said feeding means.

4. An automatic freight stacking system according to claim 1, wherein said loading scheduler means is so arranged as to previously determine the loading pattern, the loading order and the allocation of each one of said plurality of loading means such that said plurality of loading means destined for handling respective articles in dependence on the configurations thereof and arrayed on a line can load the allocated articles in the order in which said plurality of loading means are arrayed.

5. In a shipping system in which freight articles are loaded on a transporting means after determining the respective configurations of the freight articles and the number of said freight articles, an automatic freight loading system, comprising: means for reading the dimensions of each of said freight articles; means for stocking temporarily said freight articles; graphic display terminal means; means for loading the freight articles on said transporting means; and a general control means for operatively controlling the above mentioned reading, temporarily stocking, display and loading means in a coordinated manner, wherein the freight articles having the dimensions read by said reader means are temporarily stocked in said stock means, the state of residual freight articles in said means for stocking temporarily said freight articles and the disposition state of the freight articles on said transporting means being monitored through said graphic display terminal means, said loading means being furnished with information of the freight articles to be loaded and the positions on said transporting means at which said freight articles are to be positioned, for thereby loading said freight articles on said transporting means.

6. An automatic freight loading system according to claim 5, said general control means including dislocation detector means for detecting whether a loaded freight article positionally deviated from its intended positional location to a position where another article to be loaded is to be positionally placed, wherein upon detection of said positional deviation, at least one of said loading order and said operation sequence is altered.

* * * * *